United States Patent [19]

Tokoro

[11] Patent Number: 4,893,526
[45] Date of Patent: Jan. 16, 1990

[54] CONTINUOUS VARIABLE TRANSMISSION CONTROL SYSTEM

[75] Inventor: Setsuo Tokoro, Susono, Japan

[73] Assignee: Toyota Jidosha Kabushiki Kaisha, Japan

[21] Appl. No.: 98,531

[22] Filed: Sep. 17, 1987

[30] Foreign Application Priority Data

| Sep. 19, 1986 | [JP] | Japan | 61-219838 |
| Sep. 19, 1986 | [JP] | Japan | 61-219839 |
| Oct. 3, 1986 | [JP] | Japan | 61-234527 |
| Oct. 4, 1986 | [JP] | Japan | 61-235484 |
| Oct. 4, 1986 | [JP] | Japan | 61-235485 |

[51] Int. Cl.$^4$ .................................. B60K 41/14
[52] U.S. Cl. .................................. 74/866; 74/856
[58] Field of Search .............. 74/866, 867, 844, 853; 474/12, 18

[56] References Cited

U.S. PATENT DOCUMENTS

| 4,458,560 | 7/1984 | Aishin . | |
| 4,458,561 | 7/1984 | Andrew A. Frank . | |
| 4,515,040 | 5/1985 | Takeuchi et al. | 74/866 |
| 4,546,673 | 10/1985 | Shigematsu et al. | 74/866 |
| 4,715,258 | 12/1987 | Shigematsu et al. | 74/866 |
| 4,718,306 | 1/1988 | Shigematsu et al. | 74/866 |
| 4,743,223 | 5/1988 | Tokoro et al. | 74/856 X |

FOREIGN PATENT DOCUMENTS

| 58-160661 | 9/1983 | Japan . |
| 58-39870 | 3/1987 | Japan . |
| 62-110535 | 5/1987 | Japan . |
| 62-110536 | 5/1987 | Japan . |

OTHER PUBLICATIONS

ASME, 80-C2/DET-59 "The Development of a Perbury Traction Transmission for Motor Car Applications".

Primary Examiner—David A. Scherbel
Assistant Examiner—Creighton Smith
Attorney, Agent, or Firm—Oliff & Berridge

[57] ABSTRACT

A continuous variable transmission (CVT) for a vehicle provided with an internal combustion engine. The engine is provided with an actuator which is mechanically disconnected from an accelerator pedal and is used for electrically operating a throttle valve so that a desired torque is obtained. A target value of a speed of the input shaft of the CVT is calculated in accordance with a target engine horsepower or driving torque. A feedback system for the CVT is provided for obtaining the target input shaft speed, and a sensor is provided for detecting an intake air amount or intake pressure. A target value of the engine torque is calculated from the target horsepower or driving torque and actual speed of the input shaft or actual speed ratio. A feedback system responsive to the intake air amount or intake pressure is provided for providing a feedback signal for obtaining the target torque.

27 Claims, 33 Drawing Sheets

Fig. 27

| Te*\Ne | Ne(1) | --- Ne(i) --- | Ne(n) |
|---|---|---|---|
| Te*(1) | | | |
| ⋮ | | ⋮ | |
| Te*(j) | | --$\theta^P_{TH}(i,j)$-- | |
| ⋮ | | ⋮ | |
| Te*(m) | | | |

Fig. 28

| | --- Ne(i) | (Ne) | Ne(i-1) --- |
|---|---|---|---|
| ⋮ | ⋮ | | ⋮ |
| Te*(j) | --- $\theta^P_{TH}(i,j) = \theta^P_{TH}(i,j)+\Delta\theta_{11}$ | | $\theta^P_{TH}(i+1,j) = \theta^P_{TH}(i+1,j)+\Delta\theta_{12}$ |
| (Te*) | | (Ne,Te) (OPERATING POINT) | |
| Te*(j+1) | $\theta^P_{TH}(i,j+1) = \theta^P_{TH}(i,j+1)+\Delta\theta_{21}$ | | $\theta^P_{TH}(i+1,j+1) = \theta^P_{TH}(i+1,j+1)+\Delta\theta_{22}$ |
| ⋮ | | | |

CONTINUOUS VARIABLE TRANSMISSION CONTROL SYSTEM

BACKGROUND OF THE INVENTION

1. Field of the Invention

The present invention relates to a control system in a vehicle provided with a continuous variable transmission, wherein the throttle valve can be controlled regardless of the operation of an accelerator pedal.

2. Description of the Related Art

As is well known to those skilled in the art, the horsepower obtained from an internal combustion engine is determined by engine speed and torque, and there are combinations of engine speed and torque values which enable the fuel consumption to be minimized. Therefore, a system for driving a vehicle through a continuous variable transmission has been proposed in which the engine output is continuously varied regardless of the operation of the accelerator pedal. In this system, the target values of the engine speed and torque are determined in accordance with the value of the horsepower, to attain a minimum fuel consumption. The speed ratio of the transmission is controlled so that the speed of the input shaft of the transmission conforms to the target engine speed, and the degree of opening of the throttle valve is controlled so that the engine torque is equal to the target torque. In such a system, the target torque of the engine is obtained by calculating the target horsepower or a target driving torque of the vehicle. (See, for example, Japanese Unexamined Patent Publication (Kokai) No. 58-160661.) This system is advantageous in that both a low fuel consumption and a highly efficient acceleration operation, which are, per se, opposing requirements, are attained, since a required engine output power or driving torque of the transmission is obtained even when the engine is in a transient state such as an acceleration condition.

In the known system, to obtain a target engine torque, a target opening of the throttle valve is calculated from the target engine horsepower or target transmission driving torque, and a feedback control is effected so that the throttle opening is equal to the target value. However, this throttle opening control makes it difficult to obtain a correct target torque value, because of the non-linearity between the throttle opening and the engine torque. When the engine is under a low load, a large change in the intake air amount is generated by a small change in the degree of opening of the throttle value, causing a large change in the engine torque. Furthermore, even when a same degree of throttle opening is maintained, the amount of intake air actually introduced is changed by a change in the atmospheric pressure, causing a change in the engine torque.

SUMMARY OF THE INVENTION

An object of the present invention is provide a system capable of obtaining a correct target engine torque value.

According to the present invention, a system for driving a vehicle is provided comprising:
an internal combustion engine;
an accelerator member operated by a driver;
a torque control means provided in the internal combustion engine for controlling an output torque of the internal combustion engine;
an actuator means for operating the torque control means regardless of the operation of the accelerator member;
a transmission device having an input shaft connected to the engine, an output shaft connected to the vehicle, and actuator means for obtaining a continuously varied speed ratio between the input shaft and the output shaft;
a first calculating means for calculating a target speed of the input shaft of the transmission device;
a first detecting means for detecting an actual speed of the input shaft of the transmission device;
a transmission control means for controlling the actuator means for varying the speed ratio so that an actual speed of the input shaft conforms to the target speed;
a second calculating means for calculating a target value of a torque of the engine;
a second detecting means for detecting an engine parameter related to an intake air amount characteristic of the internal combustion engine;
a feedback means, responsive to the detected intake air amount characteristic, for providing a feedback signal to obtain the target torque, and;
an operating signal generating means, responsive to the feedback signal, for supplying an operating signal to the torque control means.

BRIEF DESCRIPTION OF THE DRAWINGS

FIGS. 27 and 28 illustrate the construction of maps before and after correction;

DESCRIPTION OF THE PREFERRED EMBODIMENTS

Figure 1:
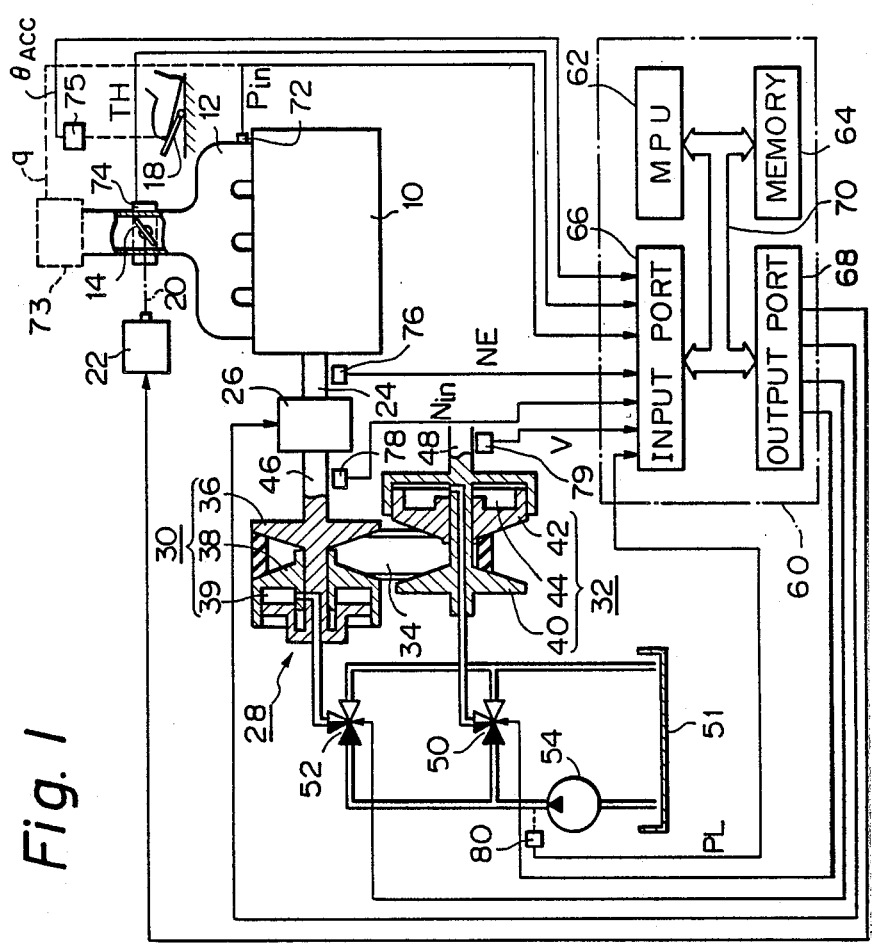
FIG. 1 is a general overall view of a CVT system according to the present invention.

In FIG. 1, reference numeral 10 denotes a body of an internal combustion engine, 12 an intake manifold, and 14 a throttle valve. The throttle valve 14 is connected, via a link member 20, to an actuator 22 for operating the throttle valve 14. The throttle valve 14 is not mechanically connected to an accelerator pedal 18.

The engine body 10 is provided with a crankshaft 24 which is connected, via a clutch 26, to a continuous variable transmission (CVT) 28. The clutch 26 is constructed as an electromagnetic powder clutch, which is, per se, well known. The CVT 30 is provided with an input pulley assembly 3 and, an output pulley assembly 32, which are connected by a V-shaped belt 34. The input pulley assembly 3 has a fixed pulley member 36, a movable pulley member 38, and a pressure chamber 39 generating a hydraulic pressure for moving the movable pulley 38 along the axis thereof. The output pulley assembly 32 has a fixed pulled member 40, a movable pulley member 42, and a pressure chamber 44 for generating a hydraulic pressure for moving the movable pulley 42 along the axis thereof. The fixed pulley member 36 of the input pulley assembly 30 is connected, via an input shaft 46, to the clutch 26. The fixed pulley member 40 of the output pulley assembly 32 has an output shaft 48 connected to a propeller shaft (not shown) connected to a wheel assembly.

V-shaped gaps, with which the V-belt 34 is engaged, are formed between the fixed and movable pulley members 36 and 38 of the input pulley assembly 30 and between the fixed and movable pulley members 40 and 42 of the output pulley assembly 32, and the width of each of these V-shaped gaps can be changed in accordance with the axial position of the movable pulley member 38 or 42. It should be noted that the hydraulic pressure in the chamber 44 in the output side is controlled, by a line pressure control valve 50, to a minimum pressure determined in accordance with the prevailing engine torque, and at which slippage of the belt 34 is prevented irrespective of the engine torque. The pressure of the chamber 39 at the input side is controlled, by the pressure control valve 52, to a control pressure for obtaining a desired speed ratio. Although this control pressure is lower than the line pressure, the effective area of the input side movable pulley 38 is larger than that of the output side pulley 42. Therefore, when the hydraulic pressure in the chamber 39 acting on the movable pulley 38 is increased, the movable pulley 38, and then the pulley 42, are moved to the right in FIG. 2 against the hydraulic pressure in the chamber 44. As a result, the width of the gap of the input side pulley 30 is reduced, and the width of the gap output side pulley 32 is increased. Therefore, the radial position of contact of the input pulley 30 with the V-shaped belt 34 becomes large and the radial position of contact of the output pulley 32 with the V-shaped belt becomes small. As a result, an increased value of a speed ratio e is obtained, which is a ratio of the rotational speed of the output shaft 48 to the rotational speed of the input shaft 46. Conversely, when the hydraulic pressure in the chamber 39 acting on the movable pulley 38 is decreased, the movable pulley 38, and then the pulley 42, are moved to the left in FIG. 2 by the hydraulic pressure in the chamber 44. As a result, the width of gap of the input side pulley 30 becomes large, and the width of the gap output side pulley 32 becomes small. Therefore, the radial position of contact of the input pulley 30 with the V-shaped belt 34 becomes small and the radial position of the contact of the output pulley 32 with the V-shaped belt becomes large. As a result, a decreased value of a speed ratio e is obtained. Namely, control of the pressure of the chamber 39 allows a continuous change in the speed ratio e.

The line pressure control valve 50 is an electromagnetic type capable of controlling the amount of fluid flowing from the hydraulic pressure pump 54 to the pressure control chamber 44. When the value of an electric current, or the value of a duty ratio corresponding to the electric current, becomes large, the amount of oil introduced into the chamber 44 is increased. Conversely, when the electric current is decreased, the amount of oil is reduced. As will be described fully later, the line pressure control valve 50 is used to control the line pressure.

The pressure control valve 52 is similarly, for example, constructed as an electromagnetic operated type, for controlling the amount of oil introduced into the pressure chamber 39 from the pump 54 in accordance with level of an electric current supplied thereto. When the value of the electric current, or the value of a duty ratio corresponding to the electric current, becomes large, the amount of oil introduced into the chamber 39 is increased. Conversely, when the electric current is decreased, the amount of oil is reduced. As will fully described later, the pressure control valve 52 is used to control the pressure in the chamber 39 to obtain a desired speed ratio value. The control circuit 60 is used to control the throttle valve actuator 22, line pressure control valve 50, and pressure control valve 52. The control circuit 60 is constructed as a micro-computer system and is provided with a microprocessing unit (MPU) 62, a memory 64, an input port 66, an output port 68, and a bus 70 interconnecting these elements. Various sensors are connected to the input port 66 for introducing corresponding engine or vehicle operating condition signals. For example, an intake pressure sensor 72 issues signals indicating an intake air pressure $P_{in}$ in the intake manifold 12; a throttle sensor 74 issues a signal TH indicating a position of the throttle valve 14; an accelerator position sensor 75 issues a signal $\theta_{ACC}$ indicating a position of an accelerator pedal 18 when depressed; an engine speed sensor 76 issues signals indicating the rotational speed NE of the crankshaft 24 of the engine 10; an input shaft speed sensor 78 issues signals indicating the rotational speed $N_{in}$ of the input shaft 46 of the CVT 28; an output shaft speed sensor 79 issues signals indicating the rotational speed of the output shaft 48 of the CVT, i.e., the vehicle speed V; and a line pressure sensor 80 issues signals indicating a line pressure controlled by the line pressure control valve 50.

The memory 64 is provided with programs and data for realizing these control routines according to the present invention.

The output port 68 is connected to the throttle valve actuator 22, an electro-magnetic powder clutch 26, a line pressure control valve 50 and a pressure control valve 52, and corresponding control signals supplied thereto.

Figure 2:
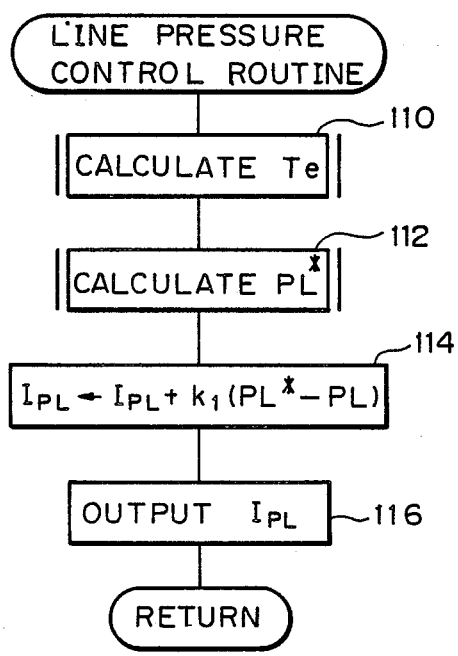
FIGS. 2 to 4 are flowcharts illustrating routines realized by the control circuit in FIG. 1.
Figure 3:
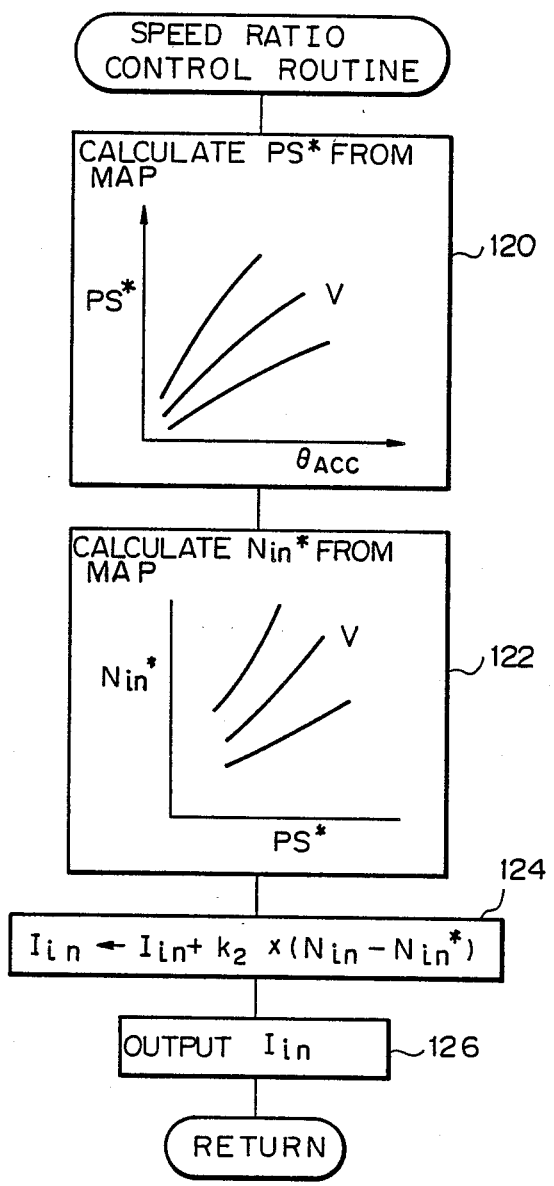
Figure 4:
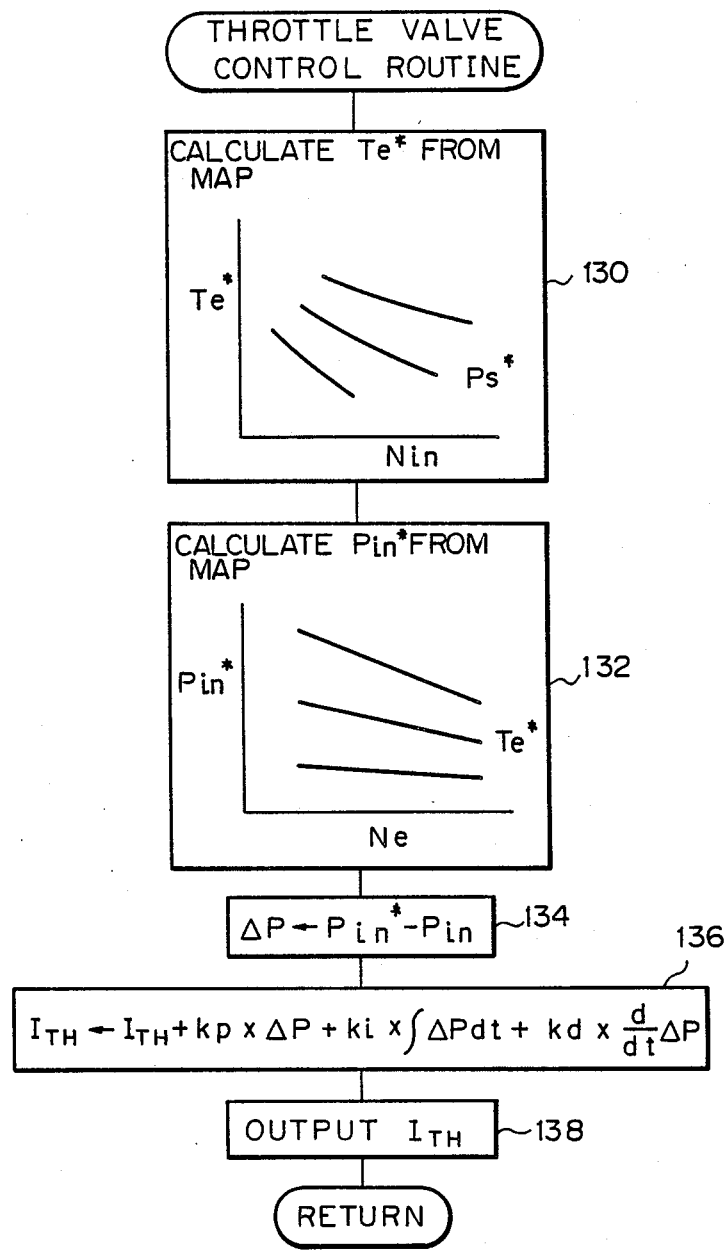
Figure 5:
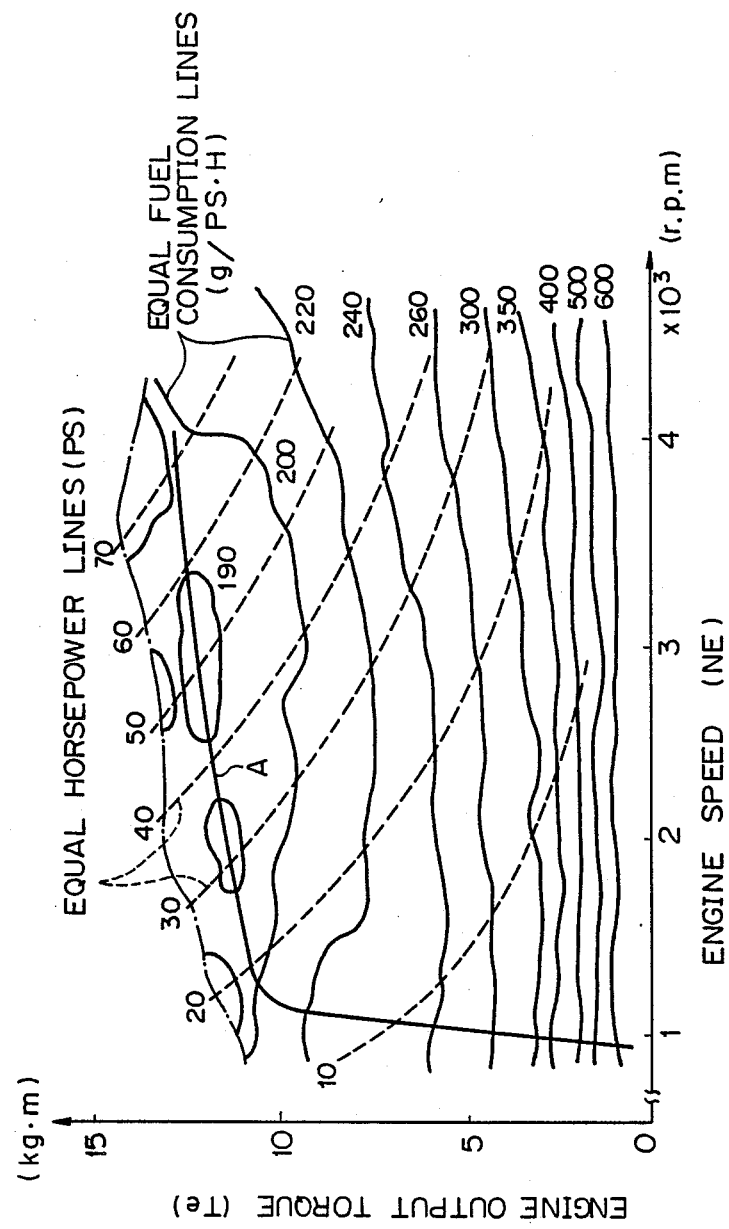
FIG. 5 illustrates equal horsepower lines and equal fuel consumption lines shown in the engine speed-engine torque coordinate system.

The operation of the control circuit 60 in the first embodiment of the present invention will be described with reference to the flowcharts in FIGS. 2 to 4. FIG. 2 shows a routine for controlling a line pressure. At block 110, an engine torque Te corresponding to an intake pressure $P_{in}$ indicative of an engine load and engine speed Ne is calculated. The memory 64 is provided with a map constructed by data of the torque Te determined by combinations of the intake pressure and engine speed. A well known interpolation from the map is effected to determine a value of the torque corresponding to a combination of the detected intake pressure and the detected engine speed. At block 112, a target value of a line pressure PL* is calculated from the Te calculated at block 110. The value of this target value of the line pressure PL* is determined so that the minimum pressure generated in the pressure chamber 44 is capable of preventing any slippage to the belt 34 at the pulley 30 and 32. At block 114, a value of an electric current (or value of a duty ratio corresponding to the electric current) $I_{PL}$ is calculated by the following equation.

$$I_{PL} = I_{PL} + k_1 \times (PL^* - PL) \quad (1),$$

where $k_1$ is a constant corresponding to a gain in a feedback system. At point 116, a signal corresponding to the electric current $I_{PL}$ is supplied to the line pressure control valve 50 from the output port 68. FIG. 3 indicates a routine for controlling a speed ratio. At block 120, a target value of the horsepower PS* is calculated from a detected accelerator pedal depression $\theta_{ACC}$ and vehicle speed V, by using a map. This map is stored in the memory 64 and contains values of the target horsepower PS* determined by combinations of the values of the accelerator pedal depression $\theta_{ACC}$ and vehicle speed V. An interpolation in the map is carried out to calculate a value of the target horsepower PS* corresponding to a combination of the detected $\theta_{ACC}$ and V. It should be noted that the value of the target horsepower with respect to the degree of depression of the accelerator pedal is determined so as to obtain a desired relationship. At block 122, a target value of the speed of the input shaft, $N_{in}$ is calculated from the target horsepower PS* and vehicle speed V. The following is an explanation of how the target value of the input shaft speed $N_{in}$ is obtained. In FIG. 5, each of the dotted lines represents an equal horsepower line of combinations of the engine speed Ne and engine output torque Te for providing a horsepower (PS) value as designated. On the other hand, each of the solid lines represents an equal fuel consumption line of combinations of the engine speed Ne and engine torque Te for providing a fuel consumption (g/PS×H) value as designated. When a minimum fuel consumption must be obtained, points showing the lowest fuel consumption on the respective equal horsepower lines are connected to obtain a line A, on which line the target values of the input shaft speed $N_{in}^*$ are set. It should be also noted that the memory 64 is provided with a map of data of the target input shaft speed $N_{in}^*$ with respect to combinations of the horsepower PS* and vehicle speed Ne, and an interpolation is effected to calculate a value of the target input shaft speed $N_{in}^*$ corresponding to the PS* calculated at block 120 and a detected value of V. At block 124, a value of an electric current $I_{in}$ in the signal is calculated by the following equation.

$$I_n = I_{in} + k_2 \times (N_{in} - N_{in}^*) \quad (2),$$

where $k_2$ is a constant corresponding to a feedback gain; and $N_{in}$ is an input shaft speed at a rotation $N_{in}$ detected by the sensor 78. Although the equations (1) and (2) are simplified and include only a proportional feedback term, an improved equation including an integral and/or differential feedback term may be incorporated.

At block 126, an $I_{in}$ signal is supplied from the output port 68 to the pressure control valve 52. As a result, the pressure in the pressure chamber 39 controls the speed ratio e obtained by the CVT 28 so that the rotational speed $N_{in}$ of the input shaft 46 is equal to the target value $N_{in}^*$. FIG. 4 indicates a routine for controlling the throttle valve 14. At block 130, a map calculation of the target torque Te* is effected from the target horsepower PS* calculated at block 120 in FIG. 3 and the actual input shaft speed $N_{in}$ detected by the sensor 78. The memory 64 is provided with a map of target torque Te* values with respect to many combinations of target horsepower and input shaft speed values. An interpolation is carried out by using this map to calculate a value of an target engine torque Te* corresponding to a combinations of PS* and $N_{in}$ at that instant. It should be noted that a correction of the target torque when the engine is warm, or by an air-fuel ratio, can be effected to obtain a more precise target torque value. Furthermore, instead of the intake manifold pressure, a vacuum pressure which is corrected by the atmospheric pressure is detected.

At block 132, a target intake manifold pressure $P_{in}^*$ is calculated from the actual engine speed NE and the target engine torque Te* calculated at block 130. The memory 64 is provided with a map of values of the target intake manifold pressure $P_{in}^*$ with respect to a plurality of combinations of values of the actual engine speed and target engine torque. An interpolation from the map is effected to calculated a value of the target intake manifold pressure $P_{in}^*$ from a combination of Te* and the actual Ne at that instant. At block 134, a difference $\Delta P$ between the target intake pressure $P_{in}^*$ and the actual intake pressure $P_{in}$ detected by the sensor 72 is calculated. At block 136, an amount of electric current $I_{TH}$, which corresponds to the opening of the throttle valve 14, is calculated by the following equation.

$$I_{TH} = I_{TH} + K_p \times \Delta P + K_i \times \int \Delta P dt + k_d \times ((d/dt)\Delta P) \quad (3),$$

where $k_p$, $k_i$, and $k_d$ correspond to feedback gains in proportional, integral, and differential terms, respectively. The equation (3) may be simplified by keeping only the proportional term or proportional and integral terms, by which a response characteristic is worsened although the noise level is reduced.

At block 138, the signal $I_{TH}$ corresponding to the degree of opening of the throttle valve 14 is supplied from the outlet port 68 to the actuator 22.

Figure 6:
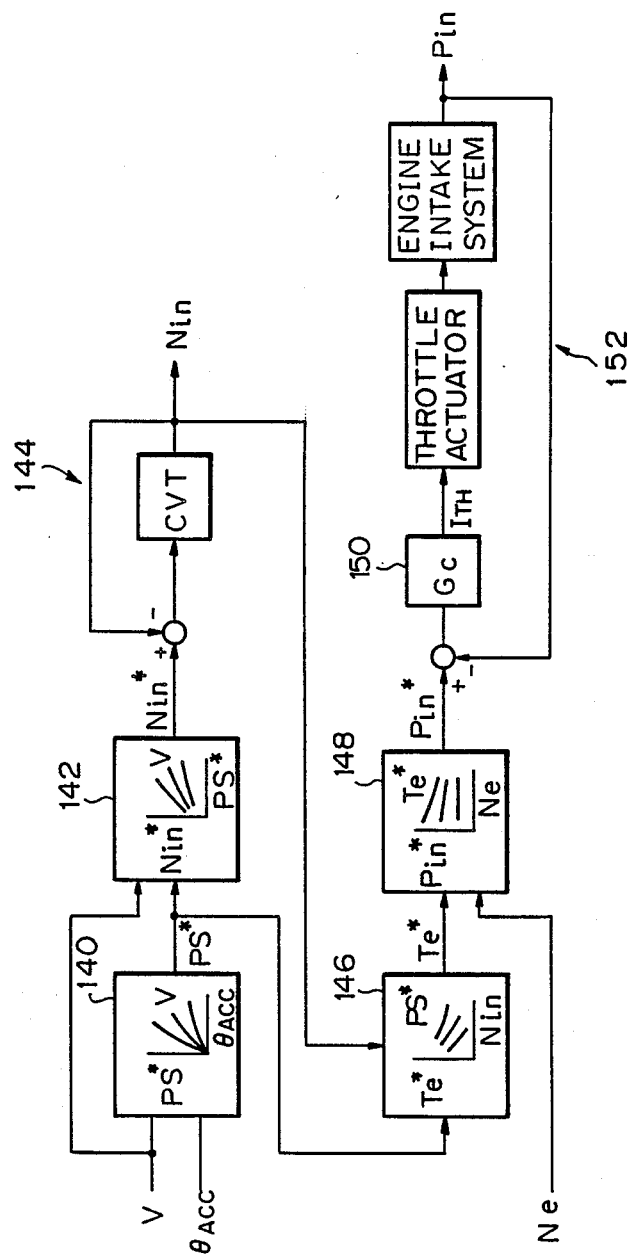
FIG. 6 is a block diagram of a first embodiment of the present invention.

FIG. 6 shows a block diagram of the feedback control system realized by the flowcharts 2 to 4 in the first embodiment of the present invention. A block 140 sets a value of the target horsepower PS* from the degree of depression of the accelerator pedal $\theta_{ACC}$ and vehicle speed V. The block 142 sets a target input shaft speed $N_{in}^*$ from the target horsepower PS* and the vehicle speed V. A block 144 is a feedback section for controlling the speed ratio e so that the actual input speed $N_{in}$ is equal to the target input speed $N_{in}^*$. A block 146 calculates a target engine torque Te* from the target horsepower PS* and an actual input shaft speed $N_{in}$. A block 148 calculates a target intake manifold pressure $P_{in}*$ from the target torque Te* and an actual engine speed Ne. The block 150 calculates a feedback gain Gc. The block 152 indicates a feedback section for controlling the throttle actuator 22 so that an actual intake pressure $P_{in}$ corresponds to the target intake pressure $P_{in}*$.

The second embodiment of the present invention is characterized in that a target value of the intake air q* is calculated from the engine torque Te*, and the throttle valve actuator 22 is feedback controlled so that the actual intake air amount is equal to the target intake air amount Q. Furthermore, this embodiment features that the speed ratio e in the CVT is controlled in accordance with the target value of a transmission drive torque Td*. This embodiment can be also utilized in a system where the speed ratio e is controlled in accordance with the target horsepower PS*. In other words, in the first embodiment it is possible to control the speed ratio e in accordance with the transmission driving torque, as is the case in the second embodiment.

The second embodiment is, from the actual structural viewpoint, different from the first embodiment in that, in place of the intake air pressure sensor 72, a intake air amount sensor such as an air flow meter 73 is provided, as shown by a phantom line in FIG. 1.

Figure 7:
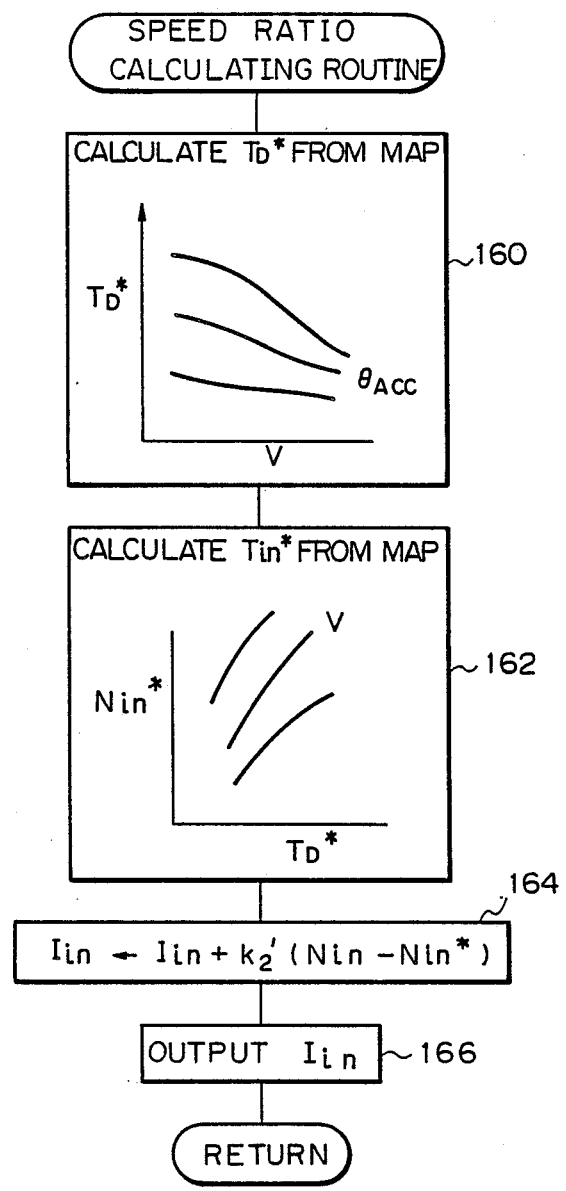
FIGS. 7 and 8 are a speed ratio control routine and a throttle control routine, respectively, of a second embodiment of the present invention.

FIG. 7 shows a speed ratio control routine in the second embodiment of the present invention. At block 160, a map calculation of a target driving torque Td* from an actual accelerator pedal depression $\theta_{ACC}$ and vehicle speed V is effected. The memory 64 is provided with a map of data of the target drive torque Td* with respect to combinations of the accelerator depression $\theta_{ACC}$ and vehicle speed V values. An interpolation is carried out to calculate a value of the target driving torque corresponding to a combination of the accelerator depression $\theta_{ACC}$ and vehicle speed V values. It should be noted that the characteristic of the target driving torque with respect to the accelerator depression is suitably determined in accordance with the vehicle speed.

At block 162, a map calculation of a target input shaft speed $N_{in}*$ is effected from the target driving torque $T_D*$. This target driving torque $T_D*$ is also calculated from the minimum fuel consumption line A in FIG. 5, since the driving torque $T_D$ can be calculated from the engine output horsepower PS. The memory 64 is provided with a table of values of the target input shaft rotational speed $N_{in}*$ capable of attaining the minimum fuel consumption with respect to a plurality of combinations of the target driving torque $T_D*$ and vehicle speed V values. An interpolation is carried out to calculate a value of the target input shaft speed $N_{in}*$ corresponding to a combination of the target driving torque $T_D*$ calculated at block 162 and vehicle speed V.

At block 164, a value of an electric current of the signal $V_{in}$ for operating the pressure control valve 52 is calculated by the following equation.

$$I_{in}=I_{in}+k_2'\times(N_{in}-N_{in}*) \quad (4),$$

where $k_2'$ is a constant corresponding to a feedback gain.

At block 166, the $I_{in}$ signal is supplied from the output port 68 to the pressure control valve 52.

Figure 8:
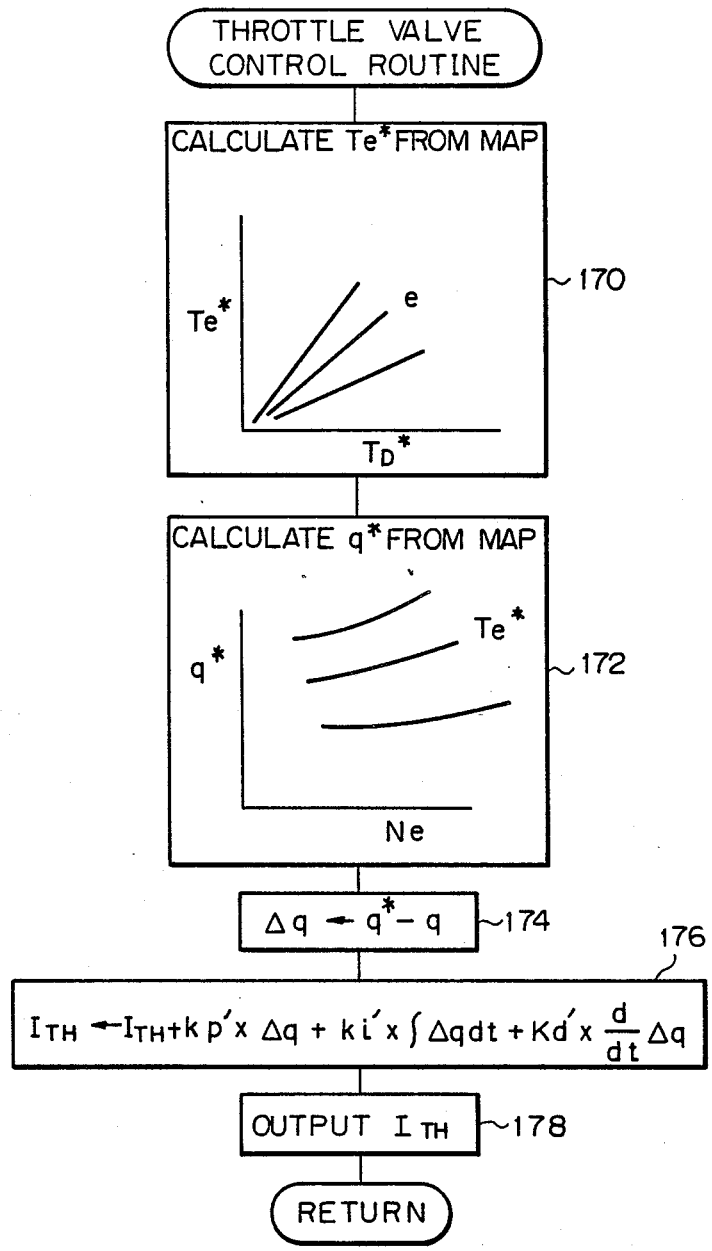

FIG. 8 shows a routine for controlling the throttle valve actuator 22. At block 170, a map calculation of the target engine torque Te* is effected from the target driving torque $T_D*$ calculated at block 160 in FIG. 7 and the speed ratio e. The memory 64 is provided with a map of data of the values of the target engine torque Te* with respect to combinations of the values of the target driving torque $T_D*$ and speed ratio e. An interpolation using the map is carried out to calculate a value of the target engine torque Te* corresponding to a combination of $T_D*$ and e at that instant.

At block 172, a calculation of a target value of an intake air amount q* is effected from the actual engine speed Ne and target engine torque Te* calculated at block 170. The memory 64 is provided with a map of data of the target intake air amount q* with respect to combinations of the engine speed Ne and target engine torque. A map interpolation is carried out to calculate a value of the target intake air amount q* corresponding to Te* and the actual Ne at that instant.

At block 174, a difference Δq between the target intake air amount calculated at the block 172 and an actual intake air amount detected by the sensor 73 is calculated. At block 176, an amount of electric current $I_{TH}$ of the signal indicating the opening of the throttle valve 14 and supplied to the actuator 22 is calculated by the following equation.

$$I_{TH}=I_{TH}+k_p'\times\Delta P+k_i'\times\int\Delta Pdt+k_d'\times((d/dt)\Delta P) \quad (5),$$

where $K_p'$, $K_i'$ and $k_d'$ are gains in proportional, integral, and differential terms, respectively, in a feedback signal. The equation (5) can be simplified so that it includes only a proportional term or proportional and integral terms.

At block 178, the signal $I_{TH}$ indicating the opening of the throttle valve 14 is supplied from the output port 68 to the actuator 22. The line pressure control routine of this embodiment is the same as that of FIG. 2 in the first embodiment.

Figure 9:
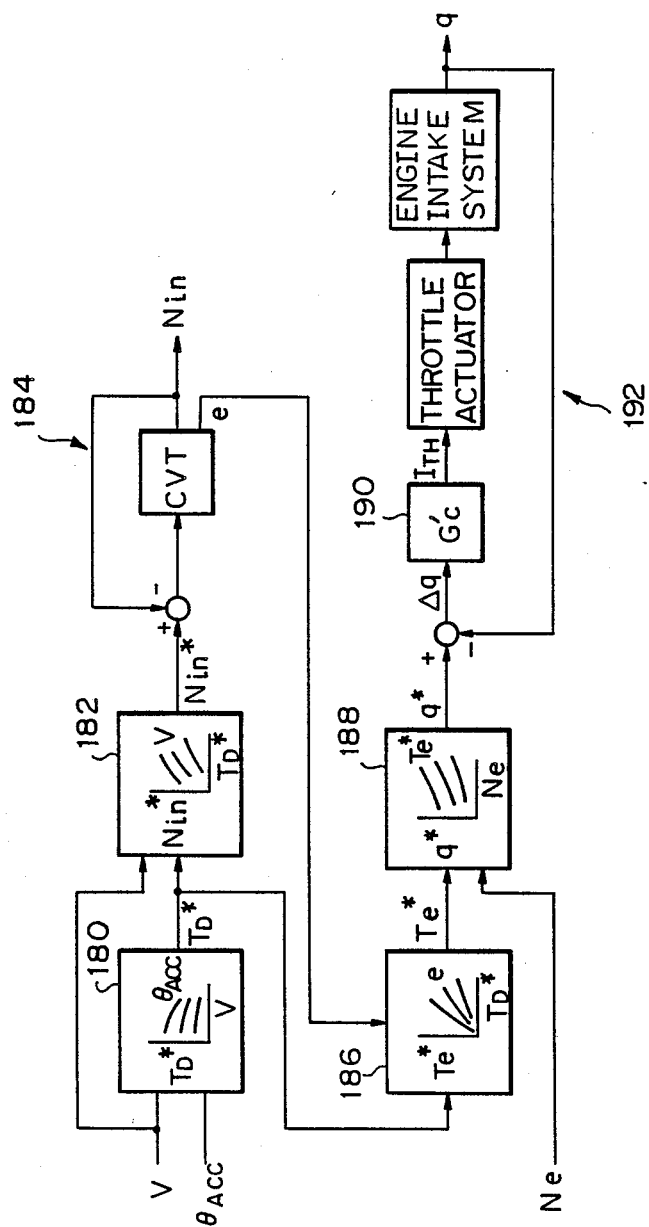
FIG. 9 is a block diagram of the second embodiment of the present invention.

FIG. 9 indicates a block diagram of the feedback control system in the second embodiment. The block 180 calculates a target driving torque $T_D*$ from the degree of depression of the accelerator pedal $\theta_{ACC}$ and the vehicle speed V. The block 182 calculates a target input shaft speed $N_{in}*$ from the target driving torque $T_D*$ and V. The block 184 is a feedback control section for the speed ratio e so that the actual input shaft speed $N_{in}$ is equal to the target input shaft speed $N_{in}*$. The block 186 calculates a target engine torque $T_e*$ from the target driving torque $T_D*$ and actual speed ratio e. The block 188 calculates a target intake air amount q* from the target engine torque $T_e*$ and the actual engine speed Ne. The block 190 calculates a feedback gain Gc'. The block 192 is a feedback control section for controlling the throttle valve actuator 22 so that the actual intake air amount Q is equal to the target intake air amount q*.

Figure 10:
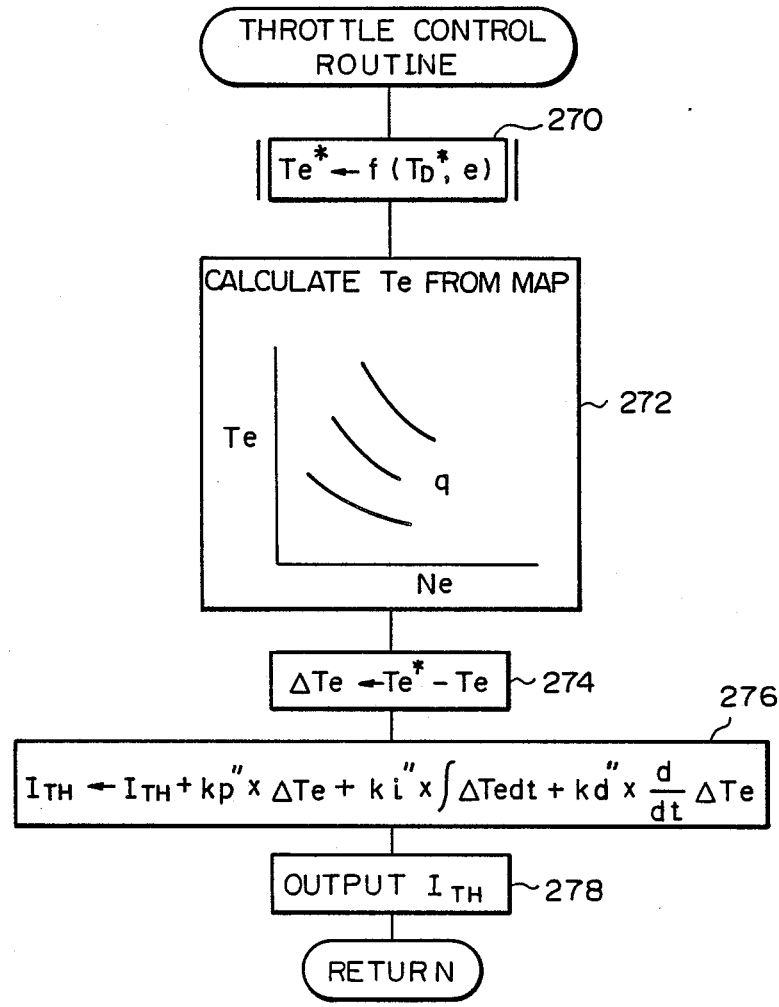
FIGS. 10 and 11 illustrate a throttle control routine and a block diagram, respectively, of a third embodiment of the present invention.

The third embodiment of the present invention is a modification of the second embodiment in that the actual torque Te is calculated by an intake air amount parameter, such as the intake air itself, which is compared with a target value of an engine torque so as to calculate the difference between the actual torque and the target value, and a feedback control is effected. FIG. 10 shows a flowchart of a throttle valve control routine in this third embodiment. At block 270, a target engine torque Te* is calculated in the same way as in the block 170 of FIG. 8 in the second embodiment. At block 272, an actual engine torque Te is calculated from an intake air amount Q and engine speed Ne. Similarly, the memory is a q-Ne map of values of the engine torque. The map values can be also corrected in accordance with an engine operating condition, such as the air-fuel ratio or temperature. At block 274, a difference Te between the target torque Te* and actual torque Te is calculated. At block 276, an amount of electric current $I_{TH}$ of the throttle valve signal to the actuator 22 is calculated by the following equation.

$$I_{TH} = I_{TH} + k_p'' \times \Delta Te + k_i'' \times \int \Delta T\text{-}edt + K_d'' \times ((d/dt)\Delta Te) \quad (5),$$

where $k_p''$, $k_i''$ and $k_d''$ are a proportional, integral and differential terms in a feedback signal. At block 278, the signal $I_{TH}$ is output. The speed ratio control routine is the same as that of FIG. 7 in the second embodiment.

Figure 11:
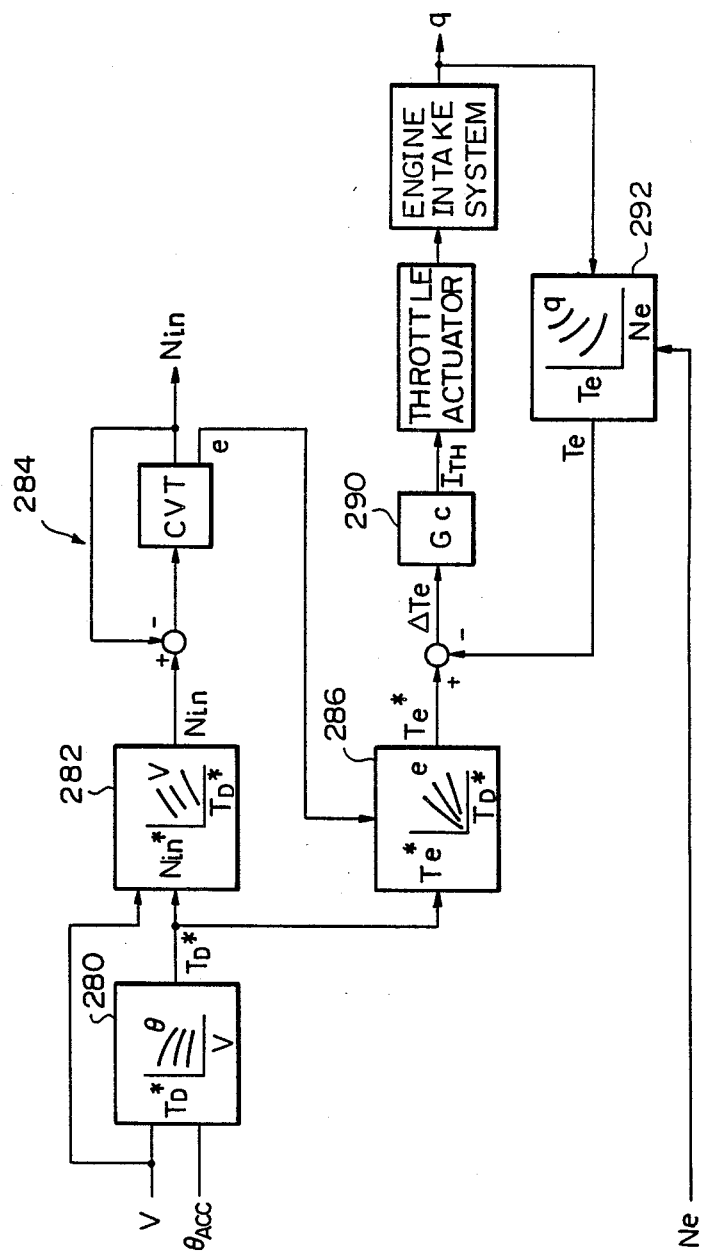

FIG. 11 shows a block diagram of the feedback system in the third embodiment, which is the same as that of the second embodiment shown in FIG. 9, except that, at block 292, an actual torque Te is calculated from an intake air amount q and engine speed Ne. It should be noted that, at block 290, a feedback signal $I_{TH}$ is calculated in accordance with the difference between the actual torque Te and the target torque Te*.

In the third embodiment, instead of detecting the intake air amount, a intake pressure is detected, and an actual torque can be calculated from the intake pressure and the engine speed.

Figure 12:
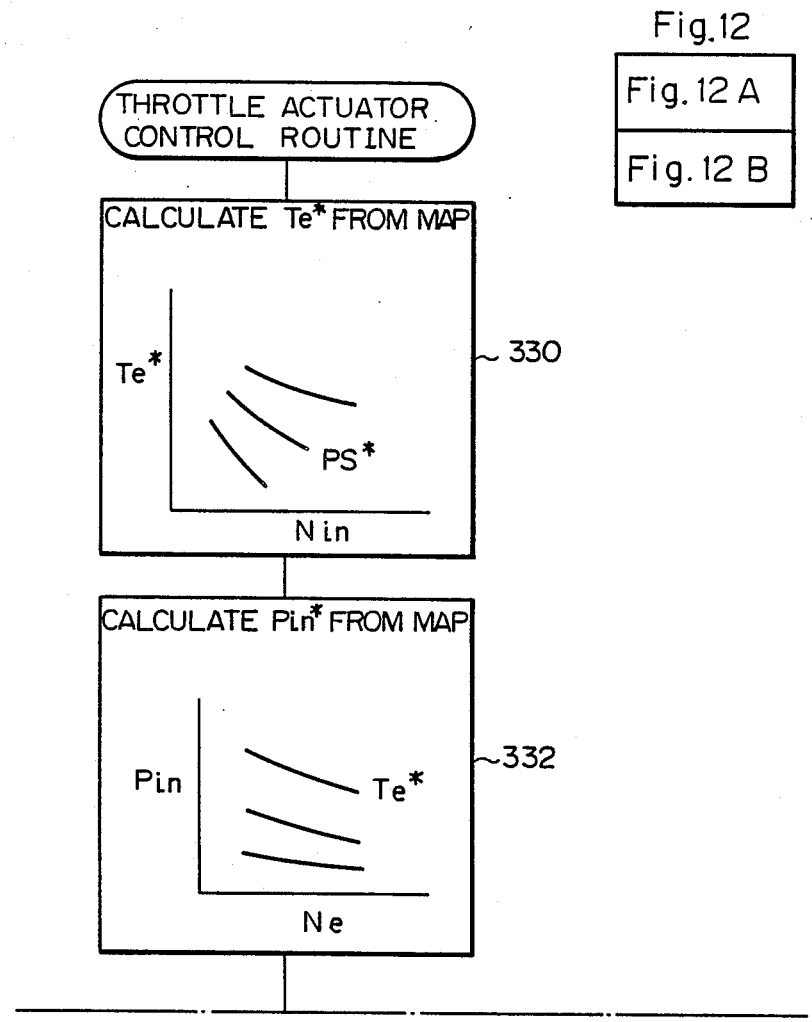
FIG. 12 is a throttle control routine of a fourth embodiment of the present invention.
Figure 12:
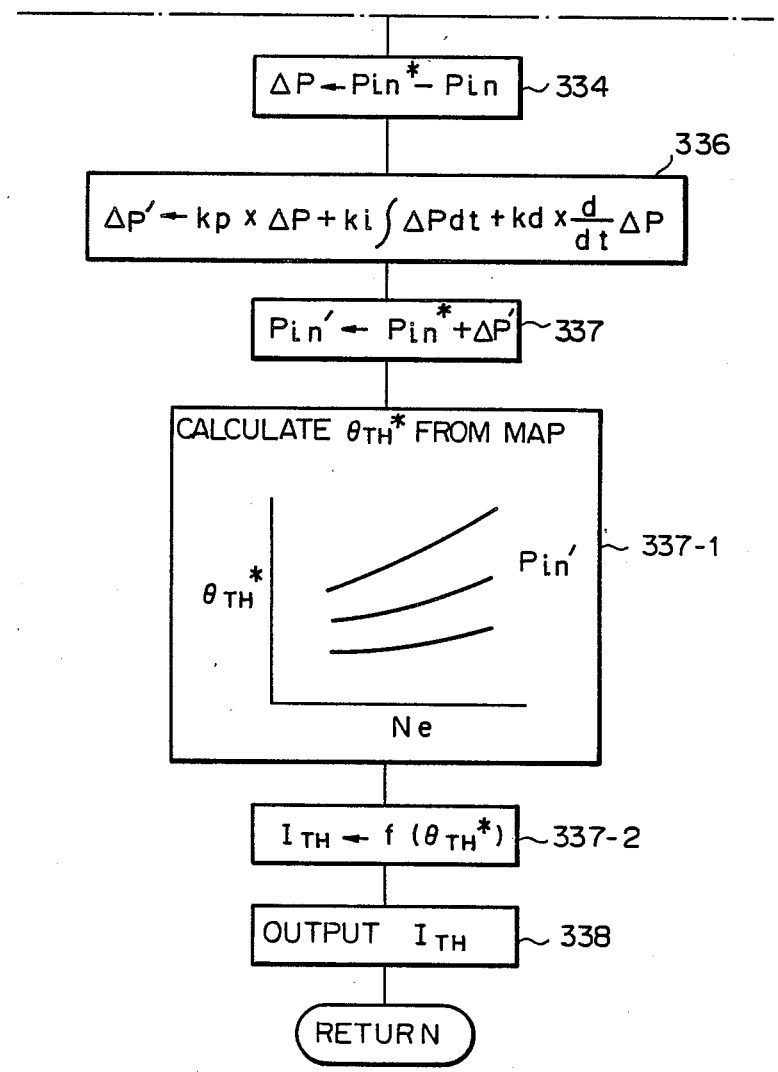
Figure 13:
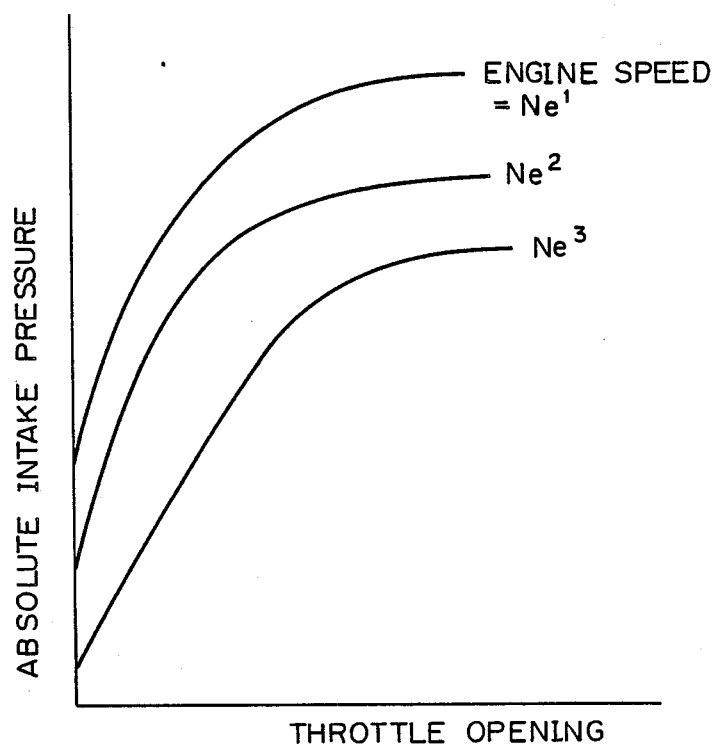
FIG. 13 shows non-linear relationships between the throttle opening and the intake pressure.
Figure 14:
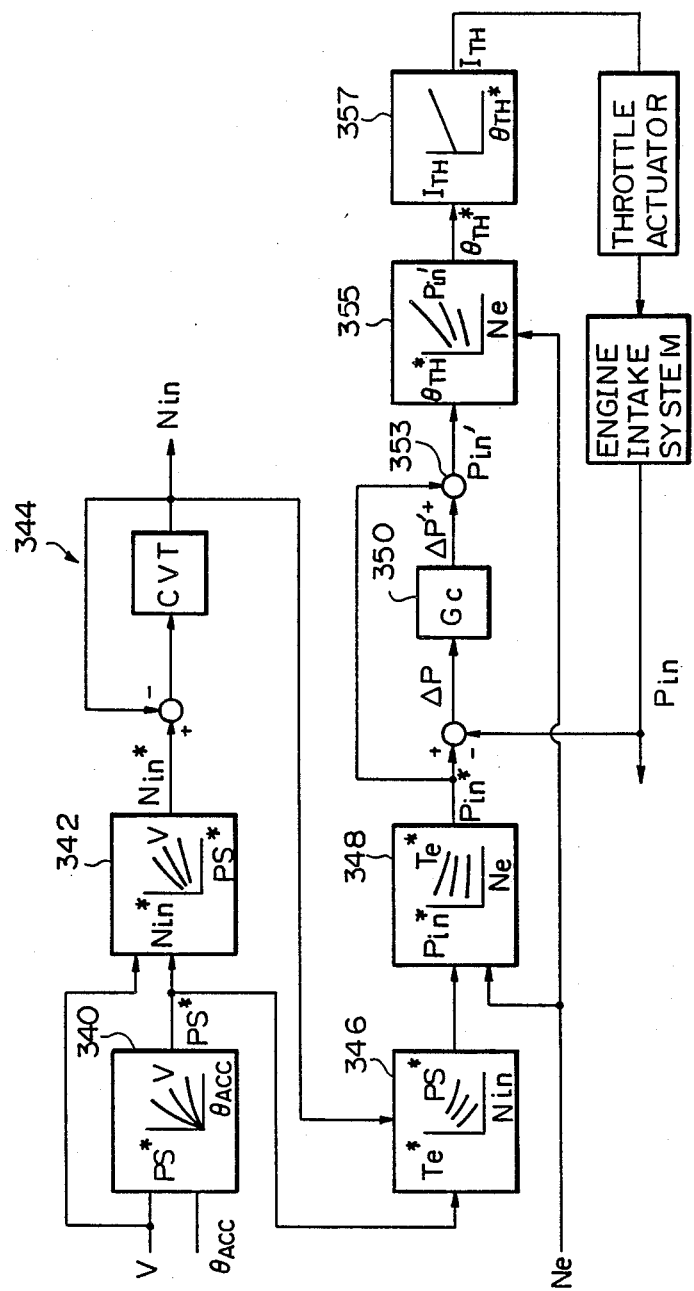
FIG. 14 is a block diagram of the fourth embodiment of the present invention.
Figure 15:
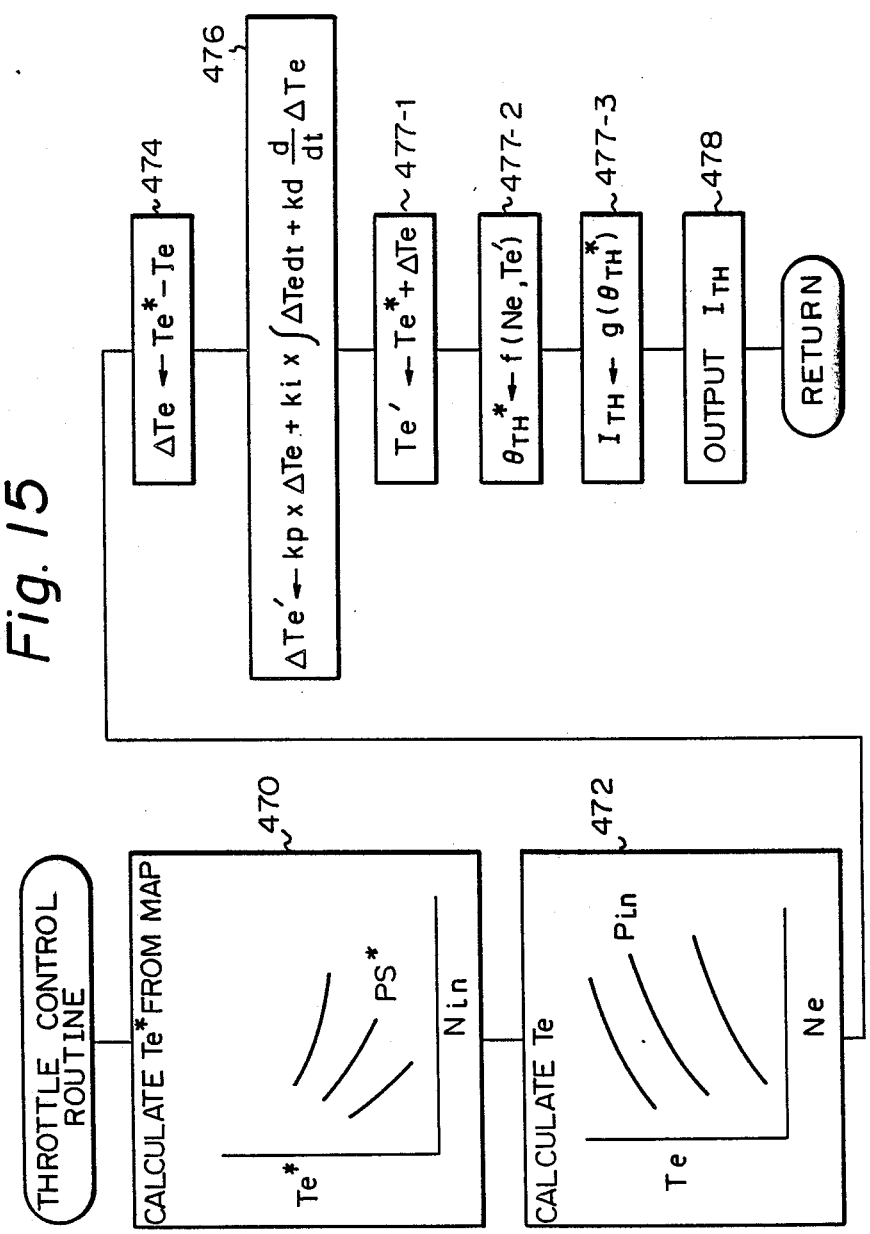
FIGS. 15 and 16 illustrate a throttle control routine and a block diagram, respectively, in a fifth embodiment of the present invention.

The fourth embodiment of the present invention is similar to the first embodiment of FIGS. 1 to 6, in that a feed back control is effected in accordance with a difference between the target intake pressure and the actual intake pressure, and the signal to the throttle valve actuator 22 is calculated in accordance with the corrected target intake pressure. The fourth embodiment differs from the first embodiment only in the throttle actuator control routine shown in FIG. 12. After the target engine torque Te* and target intake pressure have been calculated at steps 330 and 332 similar to steps 130 and 132, respectively, in FIG. 4, a difference $\Delta P$ between the target intake pressure $P_{in}$ and the actual intake pressure $P_{in}$ is calculated at step 334. Then, at block 336, a feedback correction amount $\Delta P'$ is calculated by $$\Delta P' = k_p \times \Delta P = k_i \times \int \Delta Pdt + k_d \times (d/dt(\Delta P)),$$

where $K_p$, $k_i$ and $k_d$ are feedback gains for proportional, integral, and differential terms, respectively. At block 337, a corrected target intake pressure $P_{in}'$ is calculated as the target intake pressure $P_{in}^*$ calculated at the block 332 plus the feedback correction amount $\Delta P'$ calculated at step 336. At block 337-1, a target throttle valve opening $\theta_{TH}^*$ is calculated from the engine speed Ne and the corrected target intake pressure $P_{in}'$ calculated at the block 336. As is well known to those skilled in this art, there is a non-linear relationship between the throttle opening and the intake air pressure as shown in FIG. 13. The block 337-1 is used to correct this non-linear relationship, so that a more precise target intake pressure $P_{in}'$ can be obtained and thus a very quick control to the target value realized. The memory 64 is provided with a table of data of the target throttle opening $\theta_{TH}^*$ with respect to the combinations of the engine speed Ne and corrected target intake pressure $P_{in}'$ value. A map interpolation is carried out to obtain a value of the target throttle opening $\theta_{TH}^*$ corresponding to a combination of the engine speed and corrected target intake pressure values. At block 337-2, a value of the electric current of a signal $I_{TH}$ supplied to the throttle valve actuator 22 is calculated from the target throttle opening $\theta_{TH}^*$ calculated at step 337-1 by using a predetermined function or map f. FIG. 14 indicates a block diagram of the entire feedback system of the fourth embodiment shown in part in FIG. 12. This system includes steps 340 to 348 which are similar to blocks 149 to 148, respectively, in FIG. 6 in the first embodiment. Block 350 calculates a feedback amount $\Delta P'$ from the deviation of the target intake pressure $P_{in}^*$ and the actual intake pressure $P_{in}$. Block 353 calculates a corrected target intake air pressure $P_{in}'$ as the target intake pressure $P_{in}^*$ plus the feedback amount $\Delta P'$. Block 355 calculates a value of the target throttle opening $\theta_{TH}^*$ from the engine speed Ne and the corrected target intake pressure $P_{in}'$. Block 357 calculates a value of the electric current in the throttle operating signal $I_{TH}$ from the target throttle opening $\theta_{TH}^*$. The embodiment in FIG. 14 incorporates a "feed-forward term" as a target pressure $P_{in}^*$ to be added to the feedback term at block 353 (step 337 in FIG. 12), and thus a quick control to the target value can be realized. Furthermore, the embodiment can correct the non-linearity between the degree of opening of the throttle valve and the intake pressure so that a quick control of the intake air to the target value can be realized. FIG. 15 shows a fifth embodiment which is partly similar to the first embodiment in a speed ratio control routine (FIG. 3), partly similar to the embodiment in a throttle control routine (FIG. 10) where the deviation between the actual and the target torque is calculated for obtaining a feedback term, and partly similar to the fourth embodiment (FIG. 12) wherein a feedforward term is incorporated. FIG. 15 shows a throttle control routine of this embodiment. As similar to the embodiment in FIG. 10 (steps 270, 272, and 274), a target engine torque Te*, an actual engine torque Te, and the deviation $\Delta Te$ of the target torque and actual torque are calculated at blocks 470, 472, and 474, respectively. At block 476, a feedback correction amount of the torque Te' is calculated by the following equation, $$\Delta Te' = k_p \times \Delta Te + k_i \times \int \Delta Tedt + k_d \times (d/dt(\Delta Te)),$$

where $k_p$, $k_i$ and $k_d$ are a feedback gain of proportional, integral, and differential terms, respectively. At block 477-1, a corrected target torque Te' as a "feedforward term" is calculated as the target torque Te* plus the feedback correction amount of torque Te'. At block 477-2, a target throttle opening $\theta_{TH}^*$ is calculated from the engine speed Ne and the corrected target torque Te' by using a map g. Similar to step 337-1 in FIG. 12, the memory 64 is provided with a map of data of the target throttle opening $\theta_{TH}^*$ with respect to a combination of the engine speed Ne and corrected target torque Te' values. An interpolation calculation is effected to calculate a value of the target throttle opening corresponding to a combination at that instant.

Figure 16:
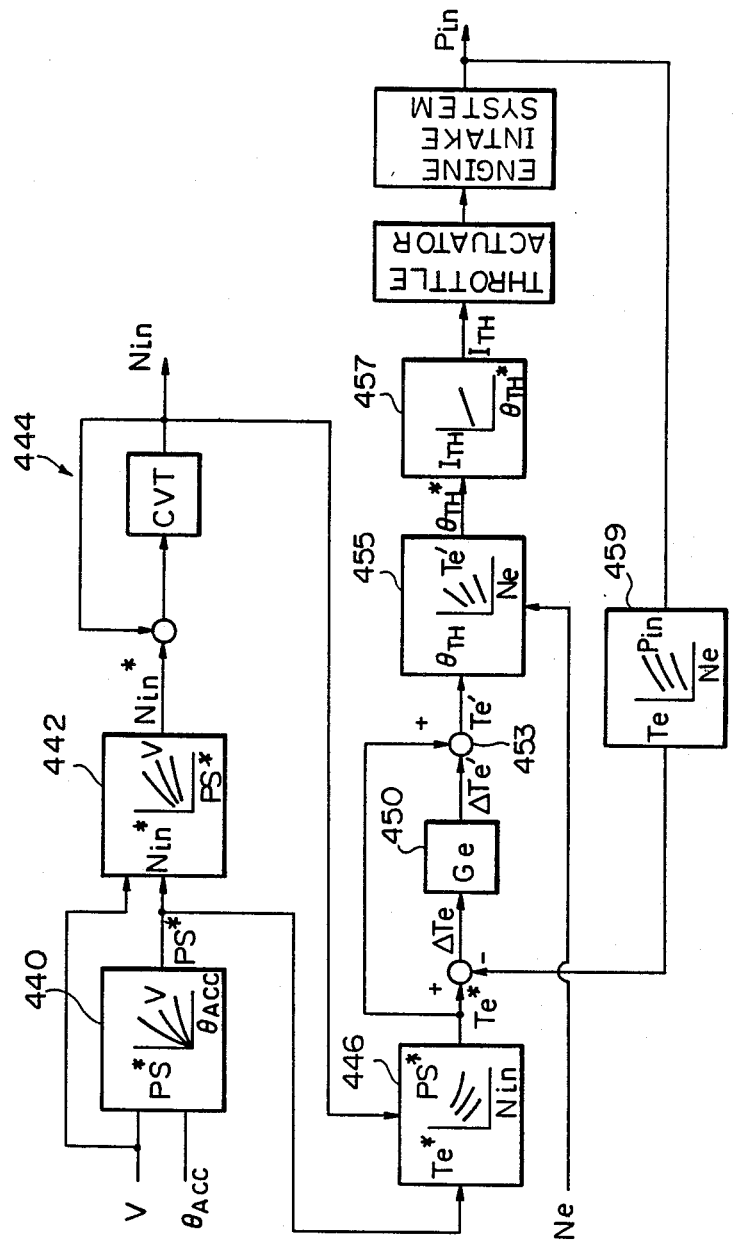

FIG. 16 shows a block diagram of the fifth embodiment. Blocks 440 to 446 are similar to blocks 140 to 146, respectively, in FIG. 6, and blocks 455 and 457 are similar to blocks 355 and 357 in FIG. 14. Block 459 calculates an actual torque Te from an actual engine speed Ne and intake pressure $P_{in}$. Block 450 calculates a corrected feedback amount $\Delta Te'$ from the deviation $\Delta Te$ between the actual and the target torque Te and Te*. A corrected target torque is calculated as a target torque Te* plus a feedback amount $\Delta Te'$ at block 453.

Figure 17A:
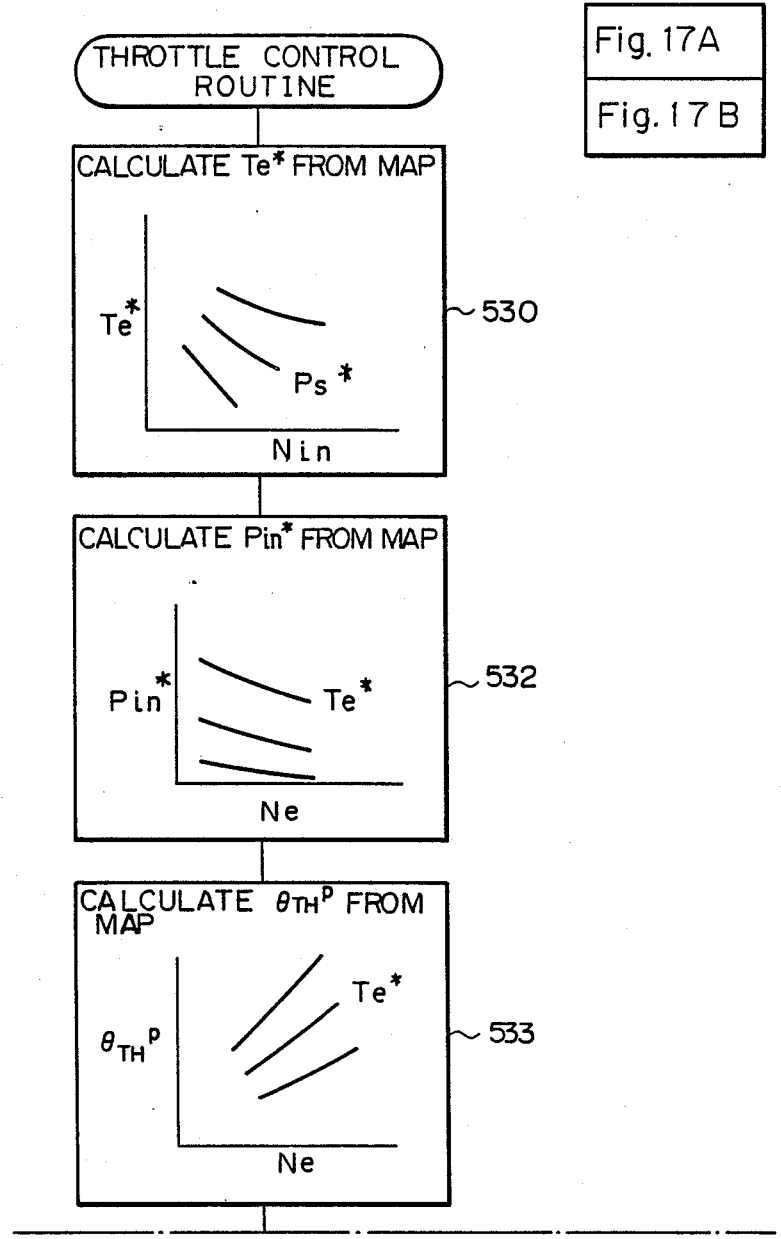
FIGS. 17 and 18 illustrate a throttle control routine and a block diagram, respectively, in a sixth embodiment of the present invention.
Figure 17B:
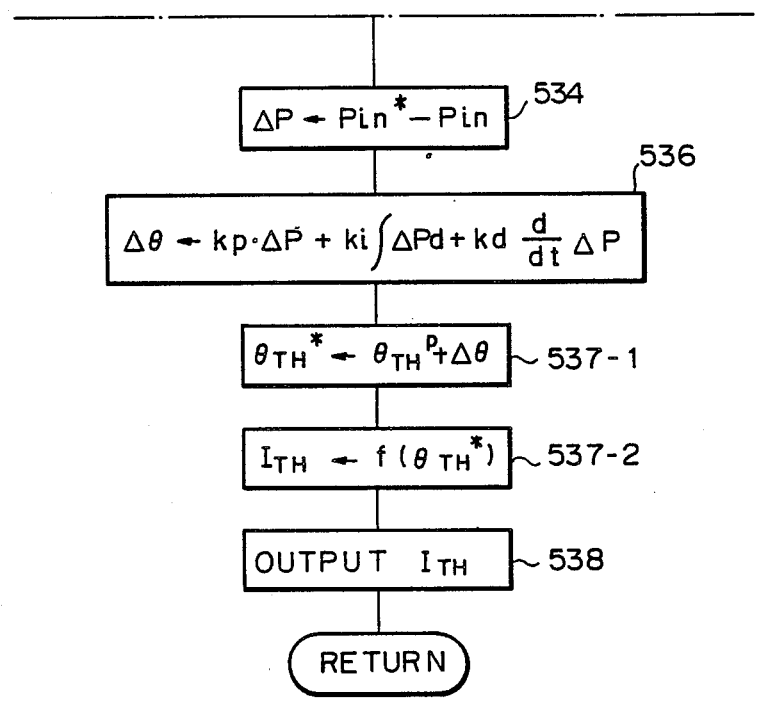
Figure 18:
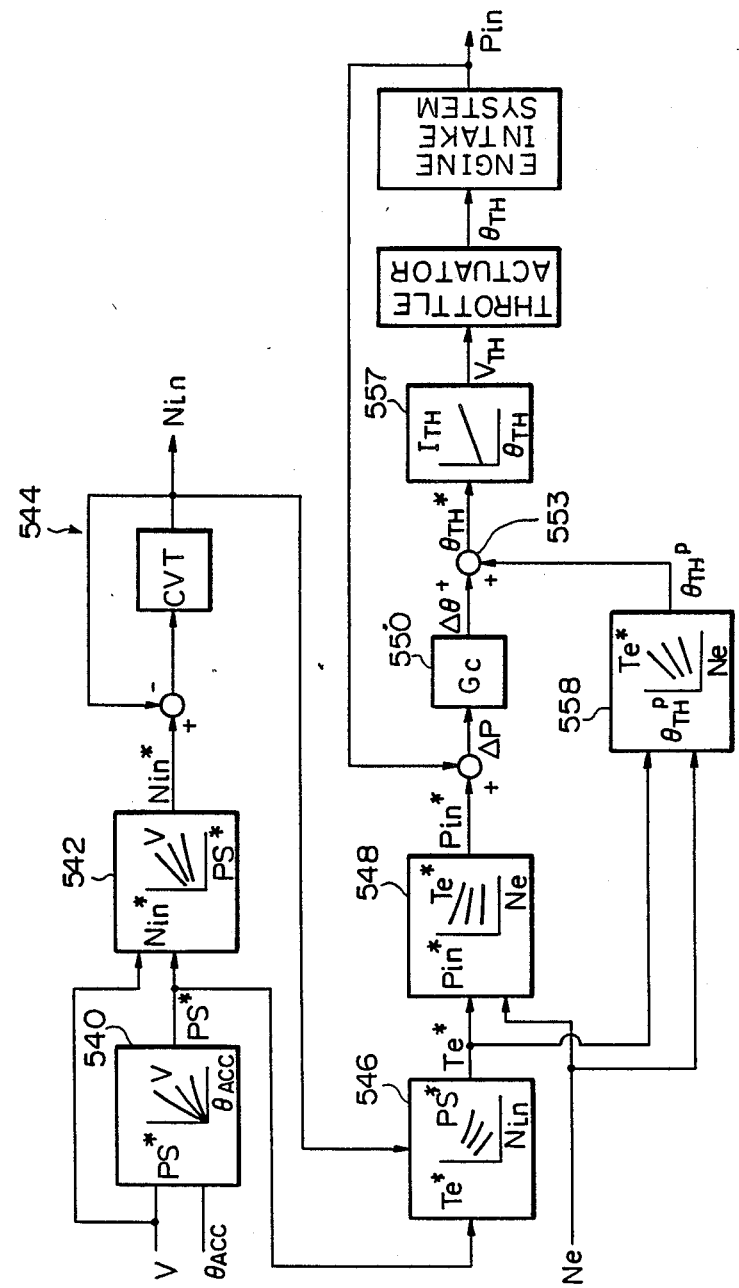

FIG. 17 is a throttle control routine in another (sixth) embodiment, which is similar to the fifth embodiment in that a target value of the degree of opening of the throttle valve $\theta_{TH}{}^*$ is calculated to obtain the throttle actuator signal $I_{TH}$, and is different therefrom in that it is calculated from a feedforward term as the degree of opening of the throttle value $\theta_{TH}{}^p$ plus a feedback term. The routine of FIG. 17 will be explained with regard mainly to the points at which it is different from FIG. 12. After the target engine torque Te* and target intake pressure Pin* are calculated at blocks 530 and 532, respectively, a feedforward term $\theta_{TH}{}^p$ of the opening of the throttle valve is calculated from the engine speed Ne and the target engine torque Te* at block 533. As will be understood, a data map of values of $\theta_{TH}{}^p$ with respect to combinations of Te* and Ne is stored in the memory 64, from which map an interpolation is carried out to obtain a value of $\theta_{TH}{}^p$. At block 534, a deviation ΔP between the target intake pressure Pin* and the actual intake pressure $P_{in}$ is calculated. At block 536, a feedback correction term Δθ is calculated in the same way as at step 336 of FIG. 12. At block 537-1, a target degree of opening of the throttle valve $\theta_{TH}{}^*$ is calculated as the feedforward term $\theta_{TH}{}^p$ plus a feedback correction term Δθ. Then, as in the previous embodiment, a value of an electric current $I_{TH}$ is calculated and the signal is supplied to the throttle actuator. FIG. 18 is a block diagram of the embodiment. At block 550, a feedback correction term Δθ as the difference between the target intake pressure Pin* and the actual intake pressure Pin is calculated. At block 558, a feedforward term $\theta TH^p$ is calculated. At block 553, a target throttle opening $\theta_{TH}{}^*$ as a sum of the feedback term Δθ and the feedforward term $\theta_{TH}{}^p$ is calculated. At block 557, an electric current $\theta_{TH}{}^*$ supplied to the throttle valve actuator is calculated.

Figure 19:
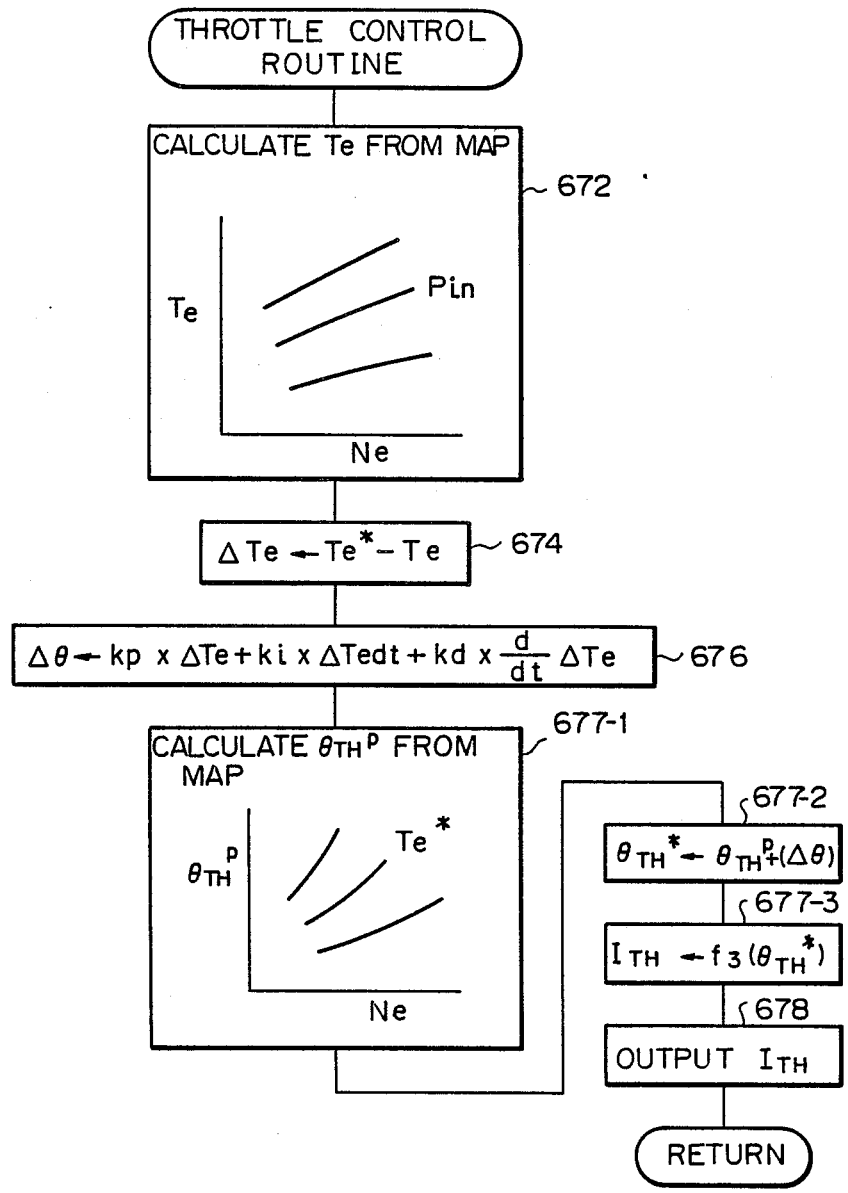
FIGS. 19 and 20 illustrate a throttle control routine and a block diagram respectively, in a seventh embodiment of the present invention.

FIG. 19 is a throttle valve control routine having the same principle as that of F17 and applied to the feedback system for controlling the engine torque to the target torque as in the embodiment in FIG. 15. The calculation steps of Te and ΔTe are effected at blocks 672 and 674, respectively, similar to steps 472 and 474 in FIG. 15. At block 676, a feedback correction term Δθ is calculated, as at point 476 in FIG. 15, from the deviation ΔTe. At block 677-1, a feedforward term $\theta_{TH}{}^p$ is calculated from Te* and the engine speed Ne. At block 677-2, the target throttle opening $\theta_{TH}{}^*$ is calculated as the feedforward term $\theta_{TH}{}^p$ plus the feedback correction term Δθ. At block 677-3, the level of the electric current $I_{TH}$ of the signal to the actuator 22 is calculated. At block 678, the $I_{TH}$ signal is output.

Figure 20:
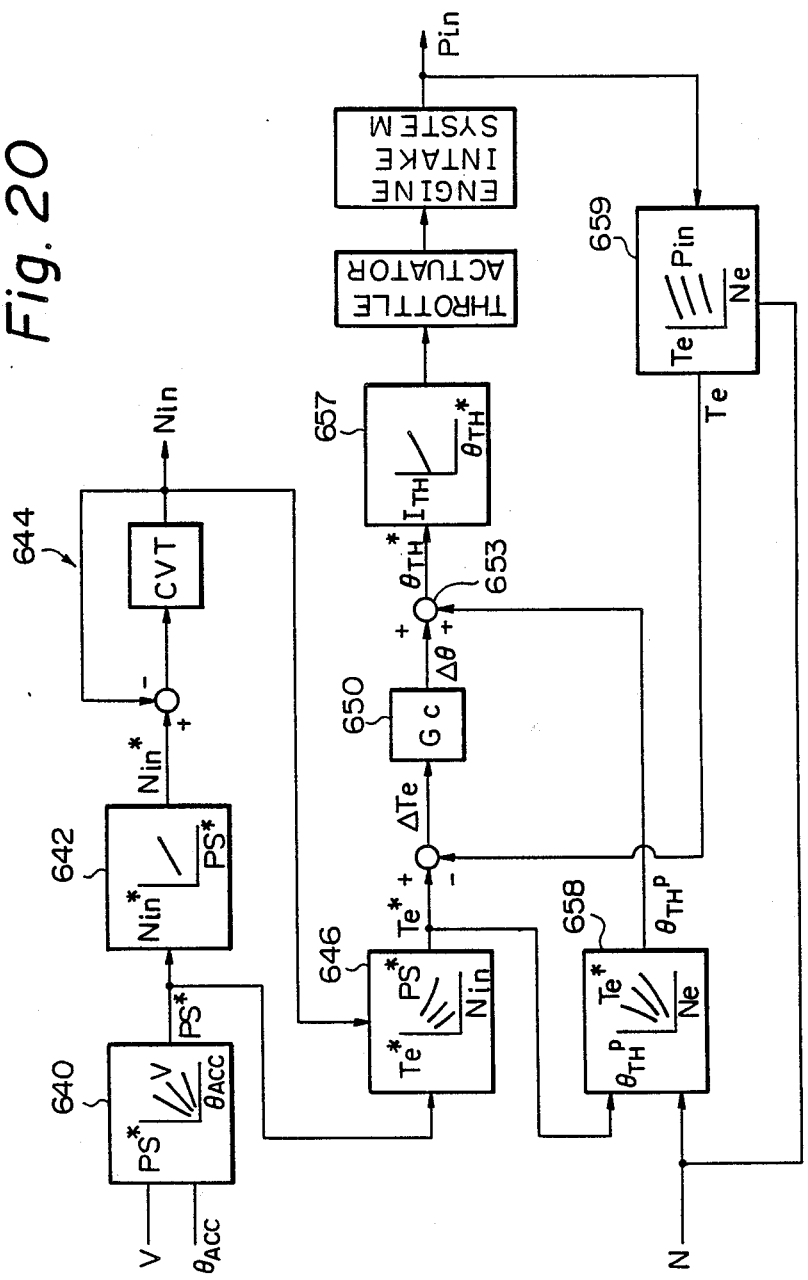

FIG. 20 is a block diagram of the embodiment in FIG. 19. At block 650, a feedback correction term Δθ is calculated from the deviation of the actual torque Te from the target Te*. At block 658, a feedforward term $\theta_{TH}{}^p$ is calculated from the target engine torque Te* and the engine speed Ne. At block 653, the target throttle opening $\theta_{TH}{}^*$ is calculated as the feedback term Δθ plus the feedforward term $\theta_{TH}{}^p$. Other blocks not explained are similar to the embodiments in FIG. 16 from the point of view that the actual torque Te is calculated at block 659 for generating a feedback signal, and to the embodiment in FIG. 18 from a point of view that a feedforward term as the target throttle opening is calculated at block 658.

In the embodiment incorporating the feedforward term $\theta_{TH}{}^p$, a quick control to the target value is realized, irrespective of any non-linearity between throttle opening and the intake pressure or intake air amount.

Figure 21A:
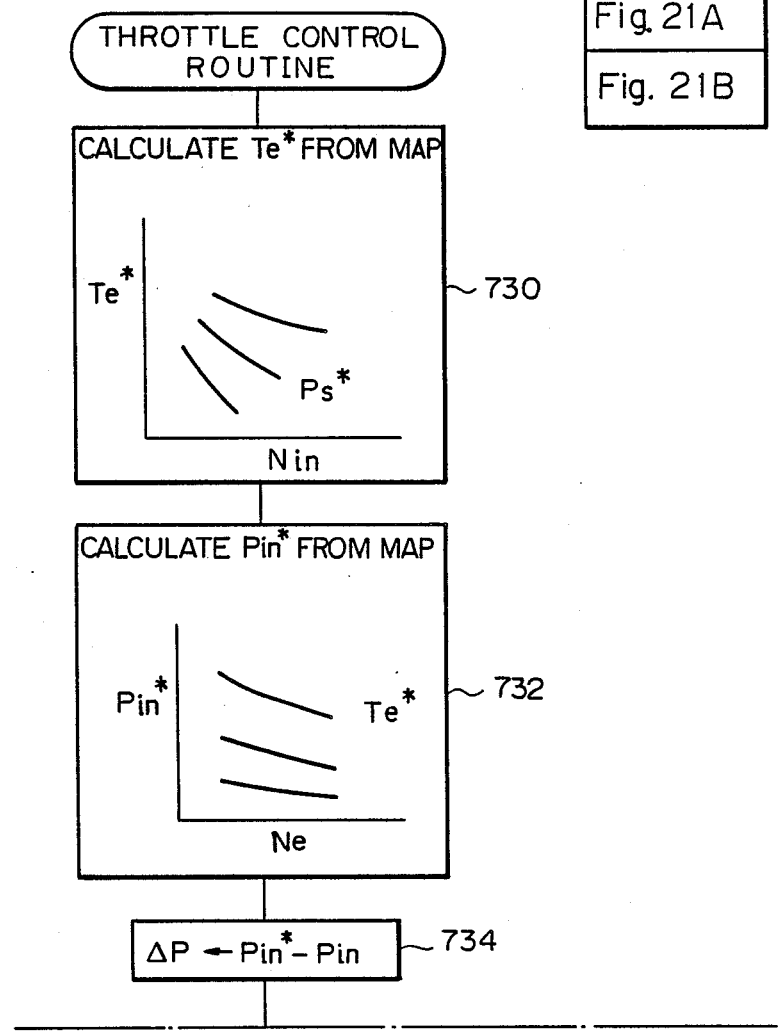
FIG. 21 is a throttle control routine in an eight embodiment of the present invention.
Figure 21B:
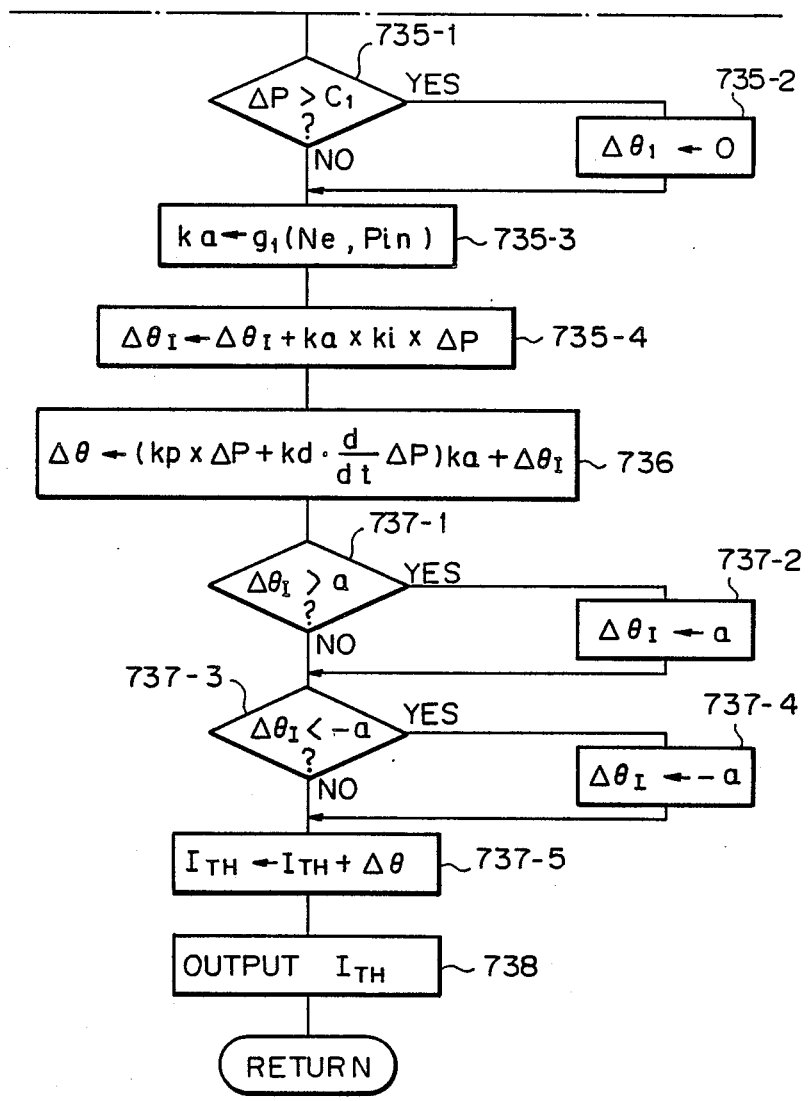

FIG. 21 shows a throttle valve control routine in another embodiment, where the feedback gain is variably controlled in order to compensate the non-linear relationship between the degree of throttle opening and the intake pressure, to realize a very quick control. The steps before step 735 are the same as the steps in FIG. 4, and therefore, an explanation thereof is omitted. At point 735-1, the value of the deviation ΔP of the intake pressure P from the target intake pressure P* is judged to determine whether it is larger than a predetermined value $C_1$. When the deviation P is larger than $C_1$, the engine is in a transient state where the engine condition has abruptly changed. In this case, the routine flows to point 735-2, where the integral term $\Delta\theta_I$ in the feedback correction term is cleared.

At block 735-3, a correction value $k_a$ of the feedback gain is calculated from the engine speed Ne and intake pressure $P_{in}$ values by using a function or map $g_1$. A map of data of the correction values $k_a$ is stored in the memory in accordance with combinations of the engine speed and intake pressure values. An interpolation calculation is, as already explained, carried out to obtain a value of the correction value $k_a$ matched to a combination of the engine speed and intake pressure values.

At block 735-4, an integration term $\Delta\theta_I$ as a feedback term is calculated by the following equation, $$\Delta\theta_I = \Delta\theta_I + k_a \times k_j \times \Delta P, \tag{9}$$

where $k_j$ is a constant. At block 736, a feedback term Δθ is calculated by the following equation, $$\Delta\theta = (k_p \times \Delta P + k_d \times ((d/dt)\Delta P)) \times k_a + \Delta\theta_I, \tag{10}$$

where $k_p$ and $k_d$ are gains of proportional and differential terms, respectively, in a feedback correction amount.

At block 737-1, it is determined if the value of the integral feedback term $\Delta\theta_I$ is larger than a predetermined value a. When $\Delta\theta_I > a$, the routine goes to step 737-2, where the predetermined upper guard value a is moved to $\Delta\theta_I$. At block 737-3, it is determined if the integral feedback term $\Delta\theta_I$ is smaller than a predetermined lower limit guard value $-a$. When $\Delta\theta_I > -a$, the routine goes to a step 737-4, where the predetermined lower limit value $-a$ is moved to $\Delta\theta_I$. The steps 737-2 to 737-4 are guard routines for preventing the value of $\Delta\theta_I$ from becoming larger than the upper limit value a or becoming smaller than the lower limit value $-a$. This can prevent hunting which might occur when the value of the deviation is abruptly changed but the change in the engine operational condition is not so rapid.

At block 737-5, the value of the electric current $I_{TH}$ in the signal supplied to the actuator is calculated from the feedback amount Δθ. At step 748, the signal $I_{TH}$ is supplied from the output port to the actuator.

Figure 22:
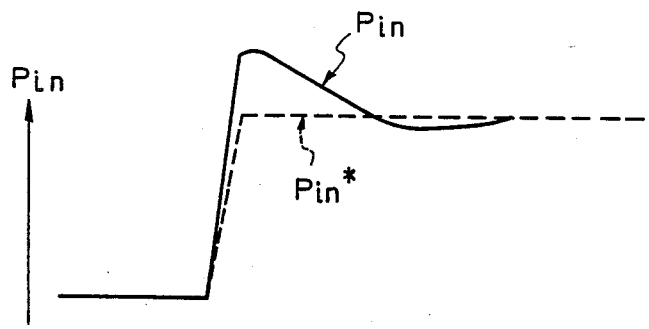
FIG. 22 illustrates a way in which the intake pressure is changed during a transient state of the engine.

This embodiment can also, as already explained, compensate a non-linear relationship between the throttle opening and the intake pressure, since the feedback gain is varied in accordance with the throttle opening, together with the engine speed. Furthermore, a generation of an overshoot during the transient state can be prevented, as explained hereinbelow. In FIG. 22, a solid line schematically shows a change in an intake pressure Pin when the target intake pressure Pin* is changed as shown by the dotted line. Due to the existence of the integral term $\Delta\theta_I$, an overshoot of the throttle opening $\theta_{TH}$ is apt to be generated. According to the embodiment in FIG. 21, the integral term $\Delta\theta_I$ is reset to zero at step 735-2 when the engine condition such as the intake pressure Pin (target pressure Pin*) is abruptly changed as shown by the dotted line in FIG. 22, which prevents an overshoot from being generated. In the embodiment in FIG. 21, a deviation of the actual intake pressure Pin from the target intake pressure Pin* is detected and compared with a predetermined value $C_1$, as shown in step 735-1 of FIG. 21. However, instead of calculating the difference between the actual and the target value of the intake pressure, the degree of change in the pressure difference $\Delta p$, degree in change of the torque target value Te*, the degree in change in the intake pressure target value Pin*, degree of change in the intake pressure Pin or torque, or degree of change of the engine speed, or any desired combination thereof, can be employed.

Figure 23:
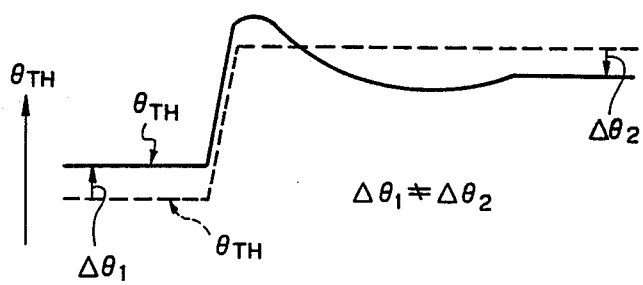
FIG. 23 illustrates a way in which a degree of opening of a throttle valve is changed during a transient state of the engine.

Under a medium rate of change of the engine condition, there may be a case where, under a large value of deviation, a quick control to the target value is difficult when $\Delta p < C_1$ at block 735-1. In this case, more time is required for the control from condition, $\Delta\theta_I = \Delta\theta_1$ to a condition, $\Delta\theta_I = \Delta\theta_2$. As shown in FIG. 23, according to the instant embodiment, the integral correction term $\Delta\theta_I$ in feedback is guarded so that it does not exceed the maximum or minimum limit, as realized by the steps 737-2 and 737-4, so that a quick control can be attained.

This embodiment comprises the same block diagram as that of FIG. 6 in the first embodiment.

Figure 24A:
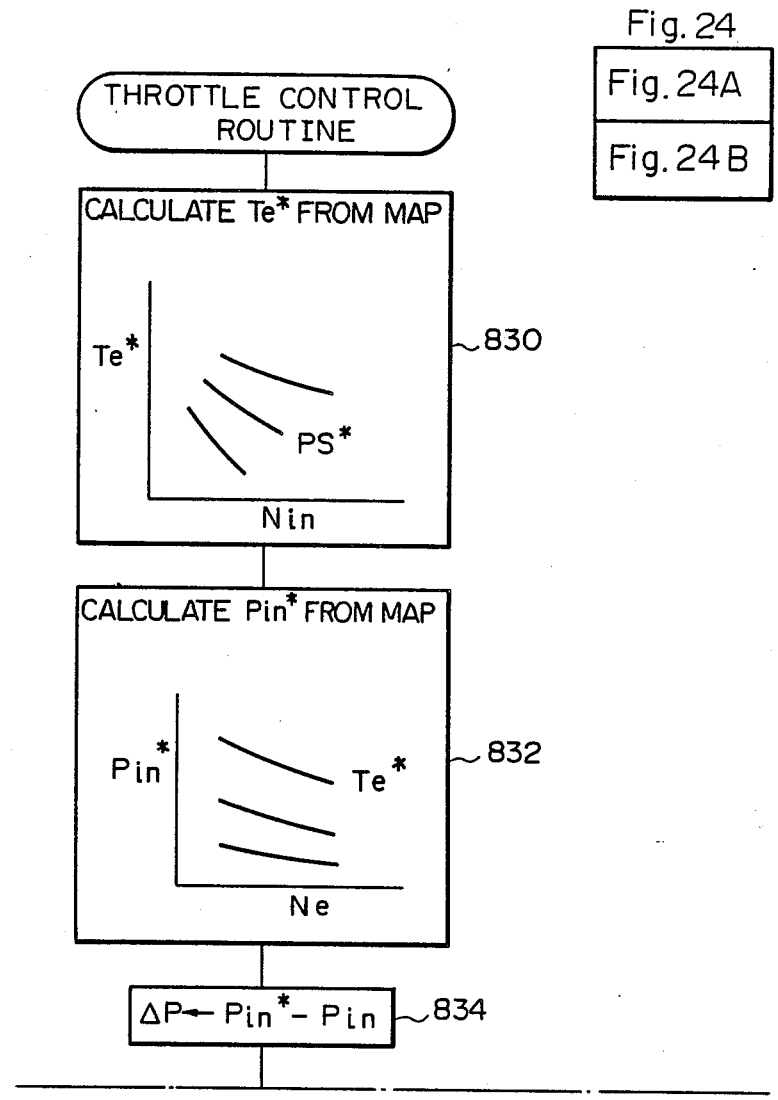
FIGS. 24 to 26 show a throttle control routine in a ninth embodiment of the present invention.
Figure 24B:
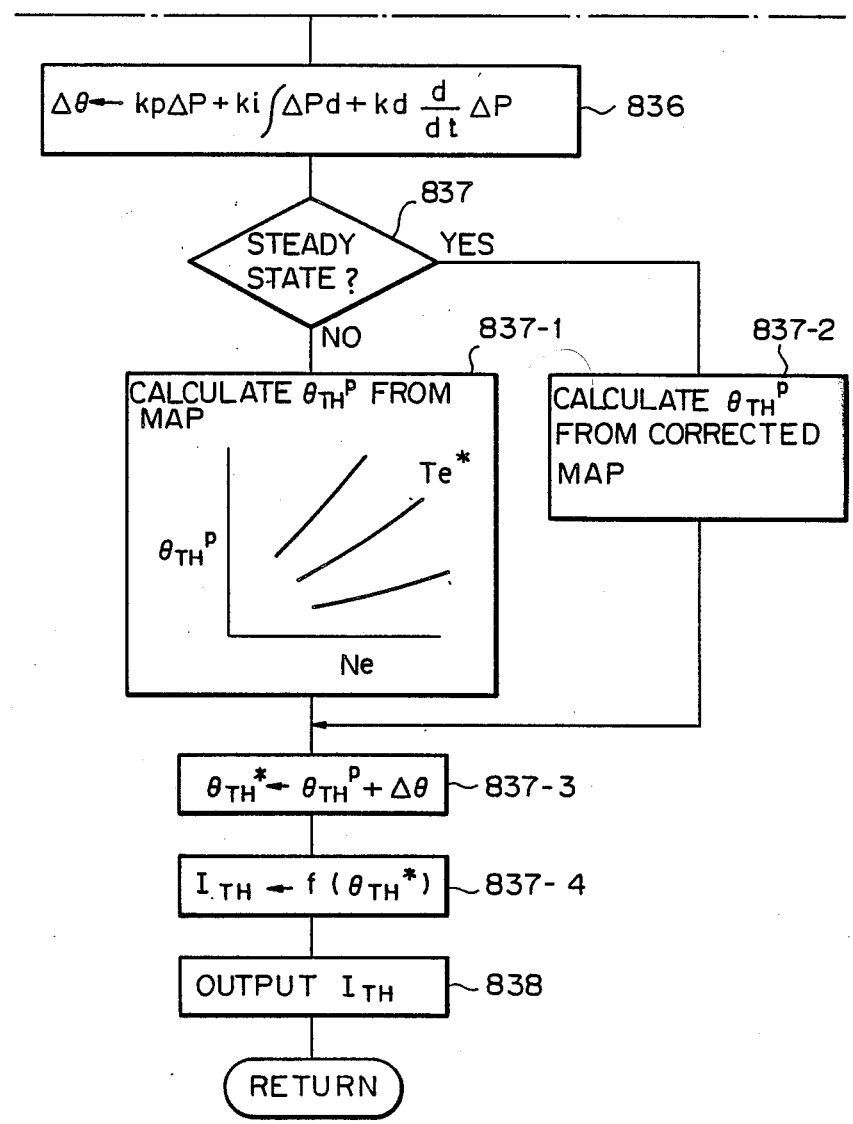

In another embodiment, which is a modification of the embodiment where the feedforward term is incorporated, the feedforward term is corrected in accordance with the feedback term. FIG. 24 is a throttle control routine in this embodiment. After passing steps 830, 832, 834 and 836, which are the same as steps 530, 532 and 534 in FIG. 17, the routine goes to step 837, where it is determined if the engine is in the steady state. This judgment can be effected in the same way as in step 735-1 in FIG. 21.

Figure 25:
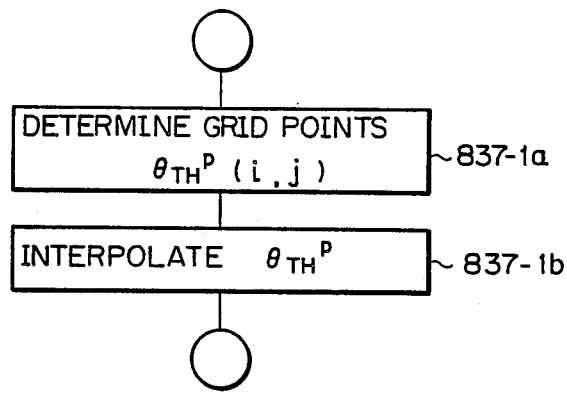

When the engine is in a state other than the steady state, the routine goes to point 837-1, where a value of the feedforward term $\theta_{TH}^p$ is calculated from the engine speed and the target torque; this step is the same as step 533 in FIG. 17. This calculation, which is an already-mentioned conventional technique, will be explained in more detail, since it will be helpful for understanding the feature of the instant embodiment. The memory 64 has, as shown by FIG. 27, a table of values of the feedforward term $\theta_{TH}^p$ with respect to combinations of the engine speed Ne(i) and torque target Te* (j) values. At step 837-1a of FIG. 25, combination points $\theta_{TH}^p(i,j)$, $\theta_{TH}^p(i+1,j)$, $\theta_{TH}^p(i,j+1)$ and $\theta_{TH}^p(i+1,j+1)$, encircling a point corresponding to the detected combination of the engine speed and calculated target values, are determined. At the following step 837-1b, interpolation calculations are made to obtain a value of the feedforward term $\theta_{TH}^p$ by the following equations.

$$t_j = ((\theta_{TH}^p(i+1,j) - \theta_{TH}^p(i,j))/(Ne(i+1)-Ne(i))) \times (Ne-Ne(i)) + \theta_{TH}^p(i,j) \quad (11)$$

$$t_j = ((\theta_{TH}^p(i,j+1))/(Ne-Ne(i))) \times (Ne(i+1)-Ne(i)) + \theta_{TH}^p(i,j+1) \quad (12)$$

$$\theta_{TH}^p = ((t_{j+1}-t_j)/(Te^*(j+1)-te^*(j))) \times (Te^* - Te^*(j)) + T_j \quad (13)$$

Figure 26:
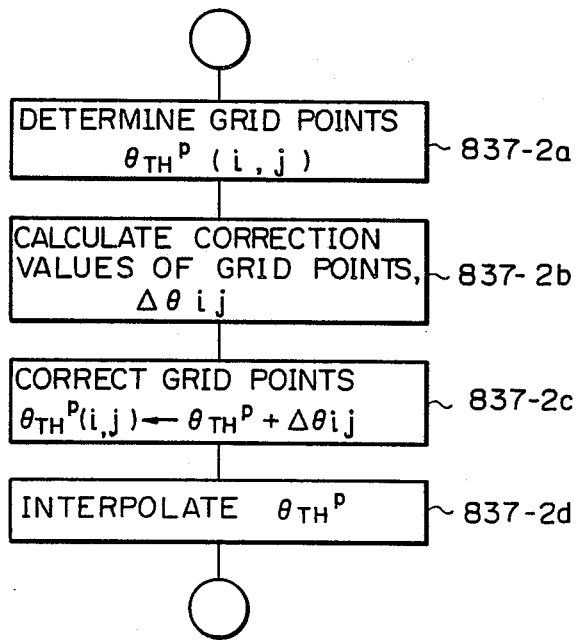

When it is determined that the engine is in the steady state at point 837 of FIG. 24, the routine goes to point 837-2, where an interpolation calculation of a feedforward term in accordance with the feedback term is carried out to increase the accuracy of the feedback control. The correction of the feedforward amount is limited to the steady state because the feedforward amount is itself obtained from the engine characteristics in the steady state. At this step 837-2, the basic grid points in map shown in FIG. 27 are corrected as shown by FIG. 28. A detail of the step 837-2 is shown in FIG. 26. At block 837-2a, a grid point is determined as in step 837-1a in FIG. 25. At block 837-2b, the correction amounts of the grid points, $\Delta\theta_{i,j}$ are calculated by the following equations.

$$\Delta\theta'' = K_e \times \Delta\theta (K_e: \text{constant}) \quad (14)$$

$$\Delta\theta_1 = (\Delta\theta''/(Ne(i+1)-Ne(i))) \times (Ne(i+1)-Ne) \quad (15)$$

$$\Delta\theta_2 = \Delta\theta'' - \Delta\theta_1 \quad (16)$$

$$\Delta\theta_{11} = ((\Delta\theta_1)/(Te^*(j+1)-Te^*(j+1)-Te^*) \quad (17)$$

$$\Delta\theta_{12} = ((\Delta\theta_2)/(Te^*(j+1))) \times (Te^*(j+1)-Te^*) \quad (18)$$

$$\Delta\theta_{21} = \Delta\theta_1 - \Delta\theta_{11} \quad (19)$$

$$\Delta\theta_{22} = \Delta\theta_2 - \Delta\theta_{12} \quad (20)$$

A step 837-2c, new grid points are calculated as the basic grid points plus the correction amount.

$$\theta_{TH}^p(i,j) = \theta_{TH}^p(i,j) + \Delta\theta_{11} \quad (21)$$

$$\theta_{TH}^p(i+1,j) = \theta_{TH}^p(i+1,j) + \Delta\theta_{12} \quad (22)$$

$$\theta_{TH}^p(i,j+1) = \theta_{TH}^p(i,j+1) + \Delta\theta_{21} \quad (23)$$

$$\theta_{TH}^p(i+1,j+1) = \theta_{TH}^p(i+1,j+1) + \Delta\theta_{22} \quad (24)$$

At step 837-2c, from these corrected grid points encircling the actual engine speed and calculated torque, interpolation calculations are effected by the equations previously shown.

The following Table I is an example of a map of $\theta_{TH}^p$ before correction when the engine speed is r.p.m. and the torque target value Te* is 20 Nm. Table II is a map of corrected grid points designated by a solid line after correction is completed at the condition where $\Delta\theta = 6\%$.

TABLE I

| Te | Ne 800 | 1600 | 2400 | 3200 | 4000 |
|---|---|---|---|---|---|
| −20 | 0 | 0 | 0 | 0 | 0 |
| 0 | 0 | 4 | 8 | 1 | 13 |
| 10 | 1 | 7 | 12 | 15 | 17 |
| 40 | 5 | 11 | 16 | 21 | 24 |
| 60 | 8 | 16 | 23 | 29 | 31 |
| 80 | 14 | 27 | 36 | 41 | 46 |
| 100 | 100 | 100 | 100 | 100 | 100 |

TABLE II

| Te | Ne 800 | 1600 | 2400 | 3200 | 4000 |
|---|---|---|---|---|---|
| −20 | 0 | 0 | 0 | 0 | 0 |

TABLE II-continued

| Te | Ne 800 | 1600 | 2400 | 3200 | 4000 |
|---|---|---|---|---|---|
| 0 | 0 | 4 | 8 | 1 | 13 |
| 10 | 1 | 9 | 12 | 15 | 17 |
| 40 | 5 | 12 | 17 | 21 | 24 |
| 60 | 8 | 16 | 23 | 29 | 31 |
| 80 | 14 | 27 | 36 | 41 | 46 |
| 100 | 100 | 100 | 100 | 100 | 100 |

Figure 29:
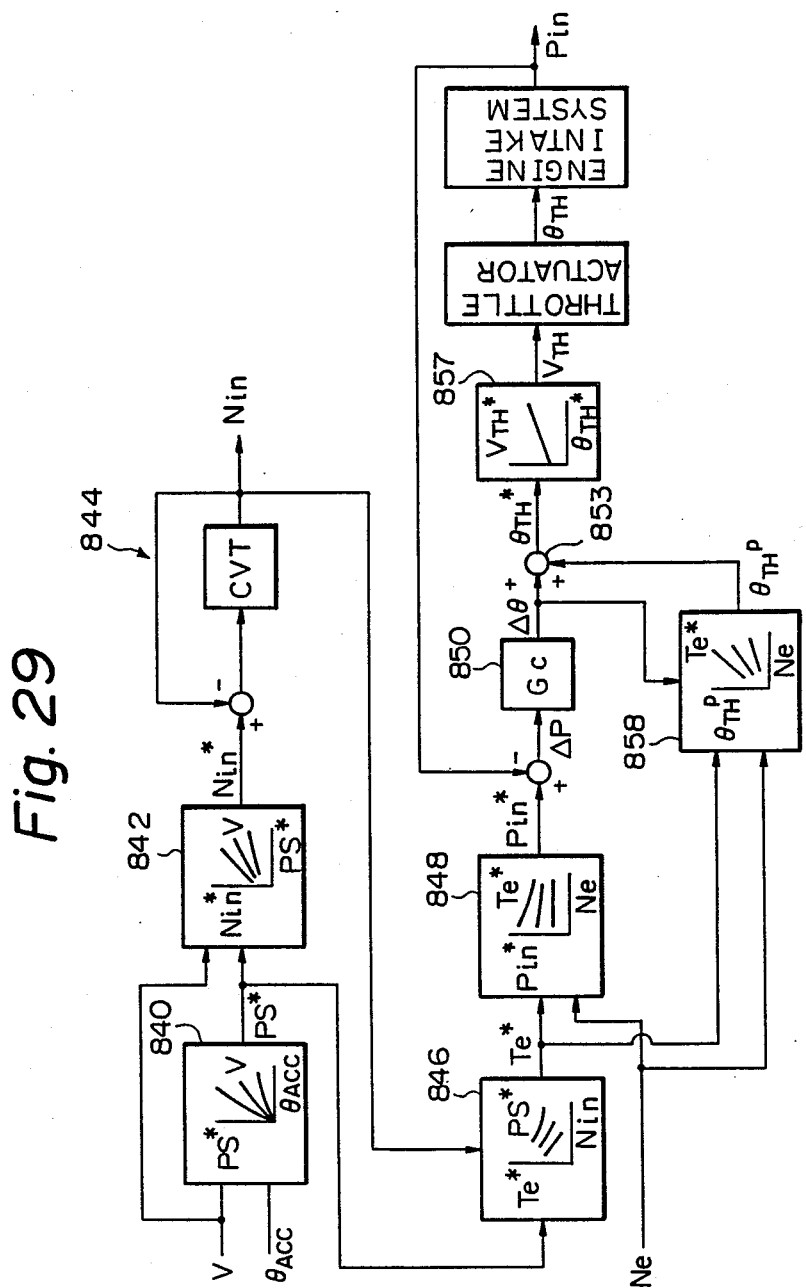
FIG. 29 is a block diagram of the embodiment illustrated in FIGS. 24 to 26; and, FIGS. 30 and 31 illustrate a throttle control routine and a block diagram, respectively, in a tenth embodiment of the present invention.

At step 837-3 of FIG. 24, the throttle valve opening target valve $\theta_{TH}^*$ is calculated as a feedforward term $\theta_{TH}^p$ plus a feedback term $\Delta\theta$. Steps 837-4 and 838 are the same as steps 677-3 and 678, respectively in FIG. 19. FIG. 29 is a block diagram of an embodiment realized by the flowchart of FIG. 24. Blocks 840 to 848 are similar to steps 540 to 548, respectively, in FIG. 18. At block 850, a deviation is calculated from $\Delta P$, and at block 858, a feedforward term $\theta_{TH}^p$ is corrected by the feedback term $\Delta\theta$ from block 850.

Figure 30A:
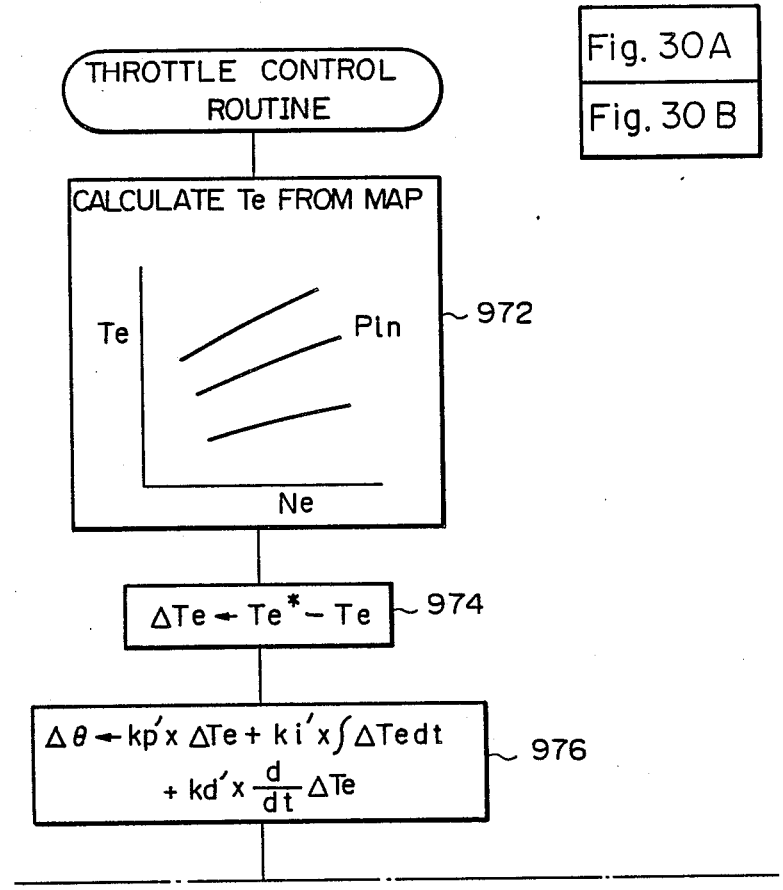
Figure 30B:
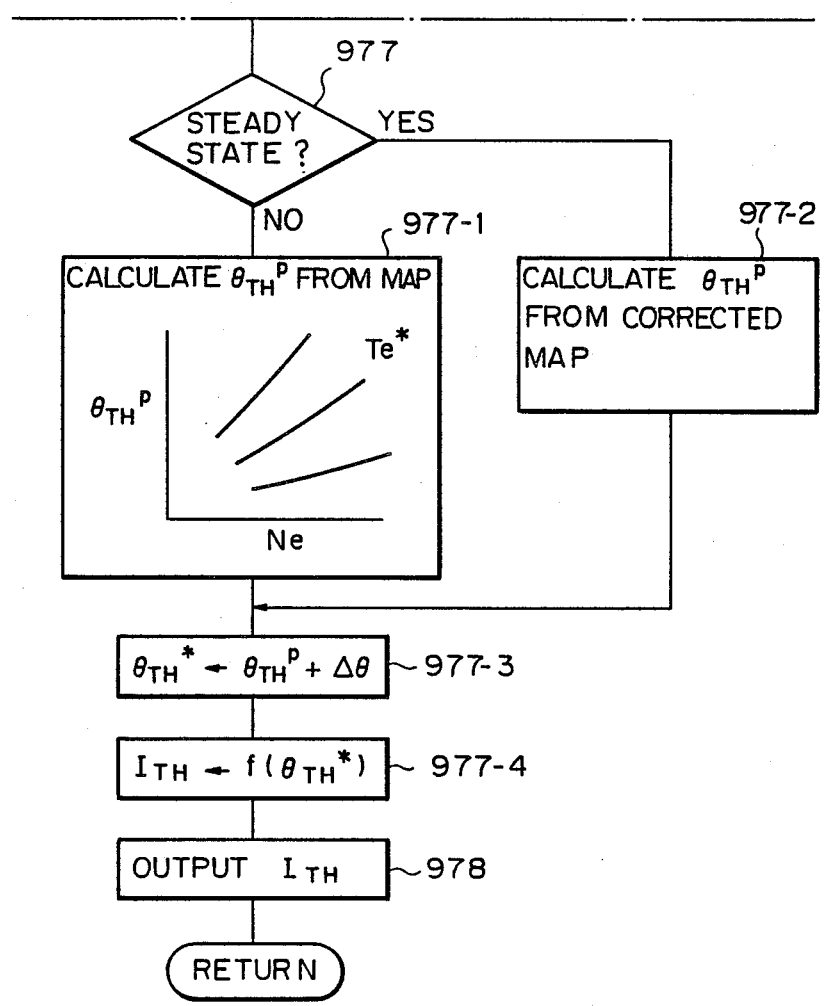

FIG. 30 is a flowchart of a throttle control routine in an embodiment where the feedback term, at steps 972 to 976, is calculated as a deviation of the torque from the target torque, as realized in the embodiment shown by FIG. 19, steps 672 to 676, and the feedforward term $\theta_{TH}^p$ is calculated at step 977-1 during a transient state (No result at block 977) and is calculated at step 977-2 during a steady state. At step 977-2, the feedforward term is corrected in accordance with the feedback term, as realized in the embodiment shown by FIG. 26, step 837-2c.

Figure 31:
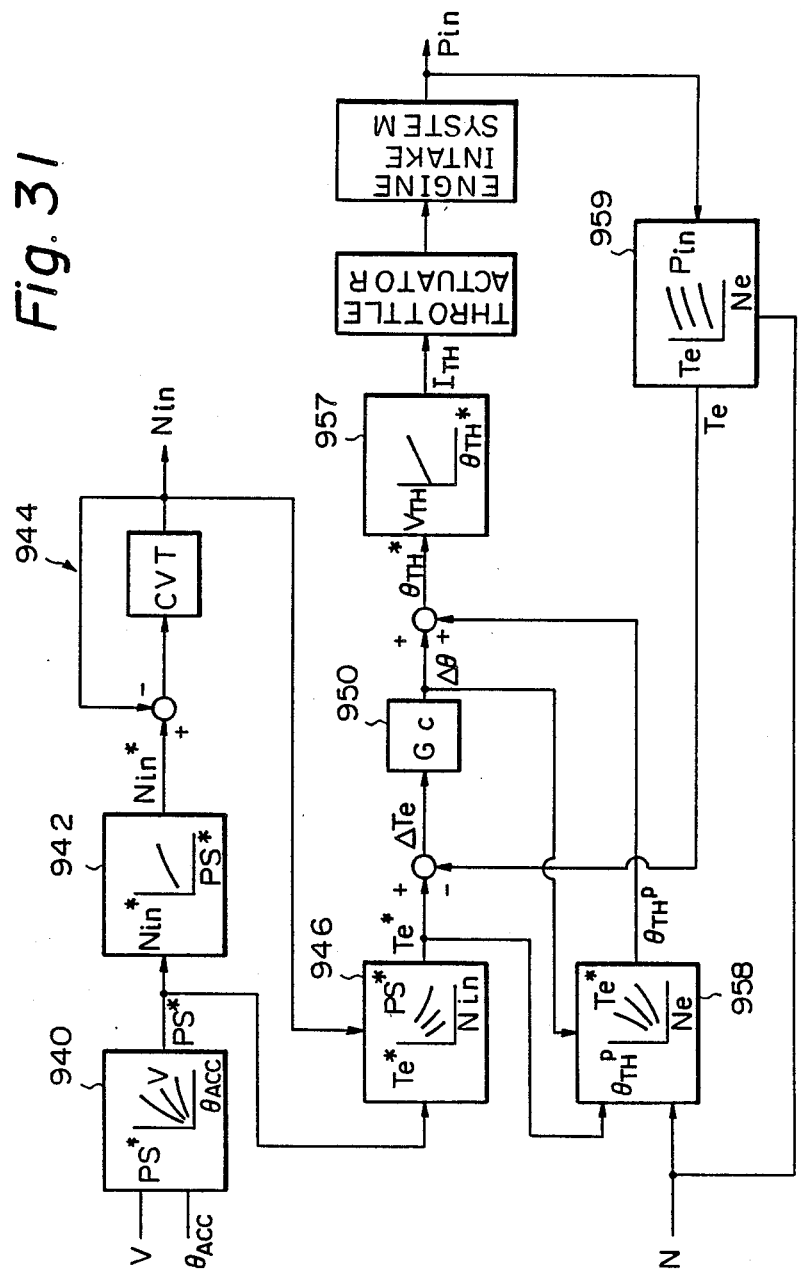

FIG. 31 is a block diagram of the embodiment realized by FIG. 30.

I claim:

1. A system for driving a vehicle, comprising:
an internal combustion engine;
an accelerator member operable by a driver;
a torque control means provided in said internal combustion engine for controlling an output torque of the internal combustion engine;
an actuator means for operating the torque control means independently of an amount of depression of the accelerator member;
a transmission device having an input shaft connected to the engine, an output shaft connected to the vehicle and actuator means for obtaining a continuously varied speed ratio between the input shaft and the output shaft;
a first calculating means for calculating a target speed of the input shaft of the transmission device;
a first detecting means for detecting an actual speed of the input shaft of the transmission device;
a transmission control means for controlling the transmission device for varying the speed ratio so that an actual speed of the input shaft conforms to the target speed;
a second calculating means for calculating a target value of a torque of the engine;
a second detecting means for detecting an engine parameter related to an intake air amount characteristic of the internal combustion engine; and
a feedback means, responsive to the detected intake air amount characteristic, for providing a feedback signal to an operating signal generating means, responsive to the feedback signal, for providing an operating signal directed to the torque control means to obtain the target torque.

2. A system according to claim 1, wherein said first calculating means comprises sensor means for detecting a degree of depression of the accelerator member, means for detecting a vehicle speed, means for calculating a target horsepower of the engine, and means for calculating a target speed of input shaft from the vehicle speed and target horsepower.

3. A system according to claim 1, wherein said first calculating means comprise sensor means for detecting a degree of depression of the accelerator member, means for detecting a vehicle speed, means for calculating a target driving torque of the transmission, and means for calculating a target speed of the input shaft from the vehicle speed and target driving torque.

4. A system according to claim 1, wherein said second calculating means comprise means for detecting a degree of the depression of the accelerator member, means for detecting a vehicle speed, means for calculating an engine output horsepower from the degree of depression of the accelerator and the vehicle speed, and means for calculating the target engine torque from the target horsepower and the detected input shaft speed.

5. A system according to claim 1, wherein said second calculating means comprise means for detecting a degree of the depression of the accelerator means, means for detecting a speed ratio of the transmission, means for detecting a vehicle speed, means for calculating a transmission target driving torque from the degree of depression of the accelerator member and the vehicle speed, and means for calculating the target engine torque from the target driving torque and the detected speed ratio.

6. A system according to claim 1, wherein said feedback means comprise means for detecting an engine speed, means for calculating a target value of an intake air amount characteristic from the target engine torque and the detected engine speed, and means for generating the feedback signal as a deviation of the detected intake air amount characteristic from the target intake amount characteristic.

7. A system according to claim 1, wherein said feedback means comprise means for detecting an engine speed, means for calculating an actual engine torque from the detected intake air amount characteristic and the engine speed, and means for generating the feedback signal as a deviation of the actual torque from the target torque.

8. A system according to claim 1, wherein said intake air amount characteristic is an intake pressure in the engine.

9. A system according to claim 1, wherein said intake air amount characteristic is an intake air amount.

10. A system according to claim 1, wherein said operating signal generating means comprise means for calculating a feedforward term, and means for obtaining, from the feedback signal and feedforward term, a target value of the degree of movement of the torque control member.

11. A system according to claim 10, wherein said obtaining means comprises means for adding the feedback portion to the feedforward portion to obtain a control signal, and means for calculating the target value of the degree of operation of the actuator from the control signal and engine speed.

12. A system according to claim 1, wherein said operating signal generating means comprise means for generating a feedforward signal indicative of the target value of the throttle opening, means for adding the feedforward signal to the feedback signal to modify the target value of the operation of the torque control means.

13. A system according to claim 1, wherein said feedback means comprise means for generating a feedback gain factor, means for calculating a deviation based on the target engine torque and the detected intake air amount characteristic, and means for generating a feedback signal based upon a product of the gain factor with the deviation, an further providing means for calculating the feedback gain in accordance with the engine operating condition.

14. A system according to claim 1, wherein said feedback means comprise means for calculating a proportional term, means for calculating an integral term, and means for adding the proportional and integral terms to provide a feedback signal, and further comprises guard means for limiting the value of the integral term in a predetermined range.

15. A system according to claim 1, wherein said feedback means comprise means for calculating a proportional term, means for calculating an integral term, and means for adding the proportional and integral terms to provide a feedback signal, and further comprises means for sensing a transient state of the engine, and means for resetting the integral term when the engine is in a transient state.

16. A system according to claim 10, further comprising means for correcting the feedforward term in accordance with the feedback term.

17. A system according to claim 16, wherein said correcting means comprise means for detecting a steady state condition of the engine, and means for allowing the correction when the engine is in the steady state.

18. A system according to claim 1, further comprising:
a third calculating means for calculating an actual engine torque from the detected engine characteristic and engine speed; and wherein
said feedback means provides said feedback signal as a deviation of the target engine torque calculated by the second calculating means from the actual engine torque calculated by the third calculating means.

19. A system according to claim 18, wherein said intake air amount characteristic is an intake pressure in the engine.

20. A system according to claim 18, wherein said intake air amount characteristic is an intake air amount.

21. A system according to claim 1, further comprising:
a third calculating means for calculating a target value of the intake air amount characteristic;
said feedback means providing said feedback signal as a deviation of the target intake air amount characteristic from the actual intake air characteristic;
said operating signal generation means comprising a control signal generating means for generating a control signal as the feedback signal plus the target value of the intake air amount characteristic as a feedforward term;
a fourth calculating means for calculating, from the control signal and the engine speed, a target value of the torque control means; and
means for generating said operating signal from the target value of the torque control means.

22. A system according to claim 1, further comprising:
a third calculating means for calculating an actual engine torque value from the detected intake characteristic and the engine speed;
said feedback means providing said feedback signal as a deviation of the target engine torque calculated by the second calculating means from the actual engine torque calculated by the third calculating means;
said operating signal generation means comprising a control signal generating means for generating a control signal as the feedback signal plus the target value of the engine torque as a feedforward term;
a fourth calculating means for calculating, from the control signal and the engine speed, a target value of the torque control means; and
means for generating said operating signal from the target value of the torque control means.

23. A system according to claim 1, further comprising:
a third calculating means for calculating an actual engine torque from the detected engine intake air amount characteristic and engine speed;
said feedback means providing said feedback signal as a deviation of the target torque from the calculated actual torque;
said operating signal generation means comprising a fourth calculating means for calculating a target degree of operation of the torque control means from the target torque and engine speed;
a fifth calculating means for calculating, from the feedback signal and the target degree of the operation of the torque control means as a feed forward term, a target value of the torque control means, and
means for generating said operating signal from the target value of the torque control means.

24. A system for driving a vehicle, comprising:
an internal combustion engine;
an accelerator member operable by a driver;
a torque control means provided in said internal combustion engine for controlling an output torque of the internal combustion engine;
an actuator means for operating the torque control means independent of a depression of the accelerator member;
a transmission device having an input shaft connected to the engine, an output connected to the vehicle and actuator means for obtaining a continuously varied speed ratio between the input shaft and the output shaft;
a first calculating means for calculating a target speed of the input shaft of the transmission device;
a first detecting means for detecting an actual speed of the input shaft of the transmission device;
a transmission control means for controlling the transmission device for varying the speed ratio so that an actual speed of the input shaft conforms to the target speed;
a second calculating means for calculating a target value of a torque of the engine;
a third calculating means for calculating a target intake characteristic value related to the intake air amount;
a second detecting means for detecting an engine parameter related to an intake air amount characteristic of the internal combustion engine; and
a feedback means for providing a feedback signal as a deviation of the target intake characteristic calculated by the third calculating means from the actual intake characteristic sensed by the second detecting means to an operating signal generating means, responsive to the feedback signal, for providing an operating signal directed to the torque control means to obtain the target torque.

25. A system according to claim 24, wherein said intake air amount characteristic is an intake pressure in the engine.

26. A system according to claim 21, wherein said intake air amount characteristic is an intake air amount.

27. A system according to claim 24, herein said operating signal generation means comprises:

a fourth calculating means for calculating a first signal indicative of the target degree of the operation of the torque control means from the target torque of the engine and engine speed;

a means for generating a second signal indicative of the target degree of operation of the torque control means from the feedback signal;

a fifth calculating means for calculating, from said first signal and said second signal as a feed forward term, a target value of the torque control means; and means for generating said operating signal from the target value of the torque control means.

* * * * *